United States Patent
Babak

(10) Patent No.: US 11,603,762 B2
(45) Date of Patent: Mar. 14, 2023

(54) TURBOCHARGER TURBINE WHEEL

(71) Applicant: Garrett Transportation I Inc., Torrance, CA (US)

(72) Inventor: Martin Babak, Velká Bíteš (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 16/438,134

(22) Filed: Jun. 11, 2019

(65) Prior Publication Data
US 2020/0392848 A1 Dec. 17, 2020

(51) Int. Cl.
| | |
|---|---|
| F01D 5/02 | (2006.01) |
| F01D 5/14 | (2006.01) |
| F04D 29/66 | (2006.01) |
| F01D 5/04 | (2006.01) |
| F02M 26/06 | (2016.01) |

(52) U.S. Cl.
CPC ............... F01D 5/02 (2013.01); F01D 5/027 (2013.01); F01D 5/048 (2013.01); F01D 5/141 (2013.01); F04D 29/662 (2013.01); F02M 26/06 (2016.02); F05D 2220/40 (2013.01)

(58) Field of Classification Search
CPC . F01D 5/02; F01D 5/027; F01D 5/141; F01D 5/048; F04D 29/662
See application file for complete search history.

(56) References Cited

U.S. PATENT DOCUMENTS

| | | | |
|---|---|---|---|
| 2011/0091324 A1* | 4/2011 | Holzschuh | F02C 6/12 416/200 A |
| 2012/0183406 A1* | 7/2012 | Yoshida | F01D 5/026 416/219 R |
| 2013/0017091 A1 | 1/2013 | Duong et al. | |

(Continued)

FOREIGN PATENT DOCUMENTS

| | | |
|---|---|---|
| EP | 2 960 463 A1 | 12/2015 |
| EP | 3 470 626 A1 | 4/2019 |

(Continued)

OTHER PUBLICATIONS

EP Application No. 20165117.1-1004, Extended European Search Report (EESR), dated Jun. 26, 2020 (12 pages).

(Continued)

Primary Examiner — Courtney D Heinle
Assistant Examiner — Michael K. Reitz
(74) Attorney, Agent, or Firm — Brian J. Pangrle

(57) ABSTRACT

An exhaust turbocharger turbine wheel can include a hub that includes a nose, a backdisk with a shaft joint portion, and a rotational axis; blades that extend from the hub to define exhaust flow channels where each of the blades includes a leading edge, a trailing edge, a hub profile, a shroud profile, a pressure side, and a suction side; where the backdisk includes an outer perimeter radius measured from the rotational axis of the hub, an intermediate radius at the shaft joint portion measured from the rotational axis of the hub, and an annular recess disposed between the intermediate radius and the outer perimeter radius and defined in part by three-dimensional bolster regions, where each of the three-dimensional bolster regions includes a footprint and a height measured at least in part in a direction of the rotational axis of the hub.

19 Claims, 18 Drawing Sheets

(56) References Cited

U.S. PATENT DOCUMENTS

| | | | |
|---|---|---|---|
| 2015/0086395 A1 | 3/2015 | Dextraze et al. | |
| 2015/0226233 A1* | 8/2015 | Yagi | F04D 29/662 |
| | | | 416/144 |
| 2015/0322793 A1* | 11/2015 | Takabatake | F02C 6/12 |
| | | | 416/183 |
| 2016/0003059 A1 | 1/2016 | Ostsubo et al. | |
| 2016/0053616 A1* | 2/2016 | Scherrer | F02B 37/00 |
| | | | 416/223 A |
| 2016/0177726 A1* | 6/2016 | Striedelmeyer | F01D 5/027 |
| | | | 416/144 |
| 2016/0265359 A1* | 9/2016 | Annati | F01D 5/027 |
| 2017/0037864 A1* | 2/2017 | Pham | F02B 33/00 |
| 2018/0313366 A1 | 11/2018 | Lehmayr et al. | |
| 2019/0112927 A1 | 4/2019 | Yellapragada et al. | |

FOREIGN PATENT DOCUMENTS

| | | |
|---|---|---|
| JP | S63 198702 A | 8/1988 |
| WO | 2013/162874 A1 | 10/2013 |

OTHER PUBLICATIONS

Knotek et al., Influence of Turbine and Compressor Wheel Mass and Inertia on the Rotor Dynamics of Turbocharger, Tribology in Industry, vol. 38, No. 1 (2016) 24-32 (9 pages), Published Mar. 2016.

\* cited by examiner

US 11,603,762 B2

TURBOCHARGER TURBINE WHEEL

TECHNICAL FIELD

Subject matter disclosed herein relates generally to turbocharger turbine wheels for internal combustion engines.

BACKGROUND

A turbocharger can include a rotating group that includes a turbine wheel and a compressor wheel that are connected to one another by a shaft. For example, a turbine wheel can be welded or otherwise connected to a shaft to form a shaft and wheel assembly (SWA) and a compressor wheel can be fit to the free end of the shaft. As an example, a shaft that is attached to one or more bladed wheels may be supported by one or more bearings disposed in a bearing housing, which may form a center housing rotating assembly (CHRA). During operation of a turbocharger, depending on factors such as size of various components, a shaft may be expected to rotate at speeds in excess of 200,000 rpm. To ensure proper rotordynamic performance, a rotating group should be well balanced over a wide range of conditions (e.g., operational, temperature, pressure, etc.).

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
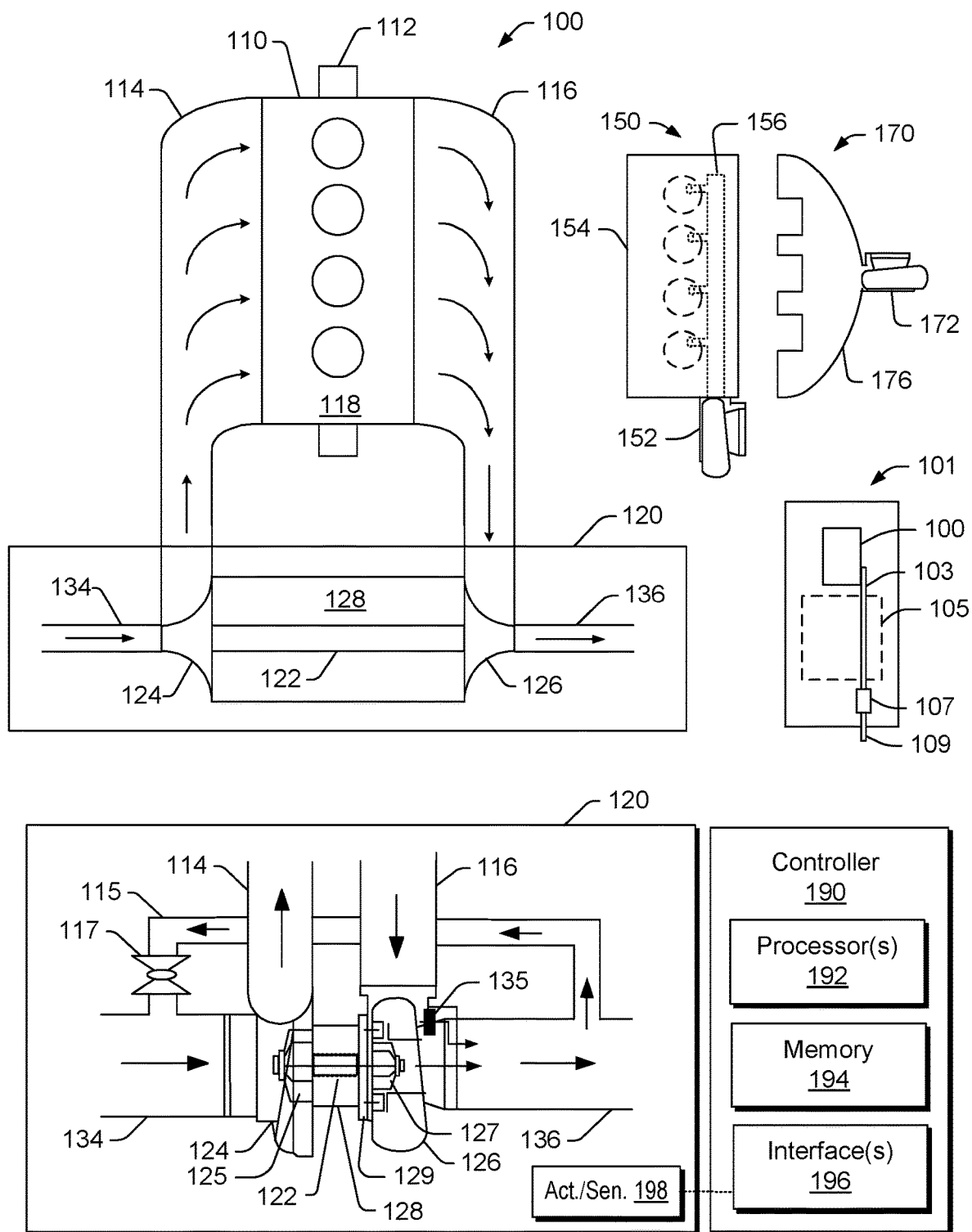
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
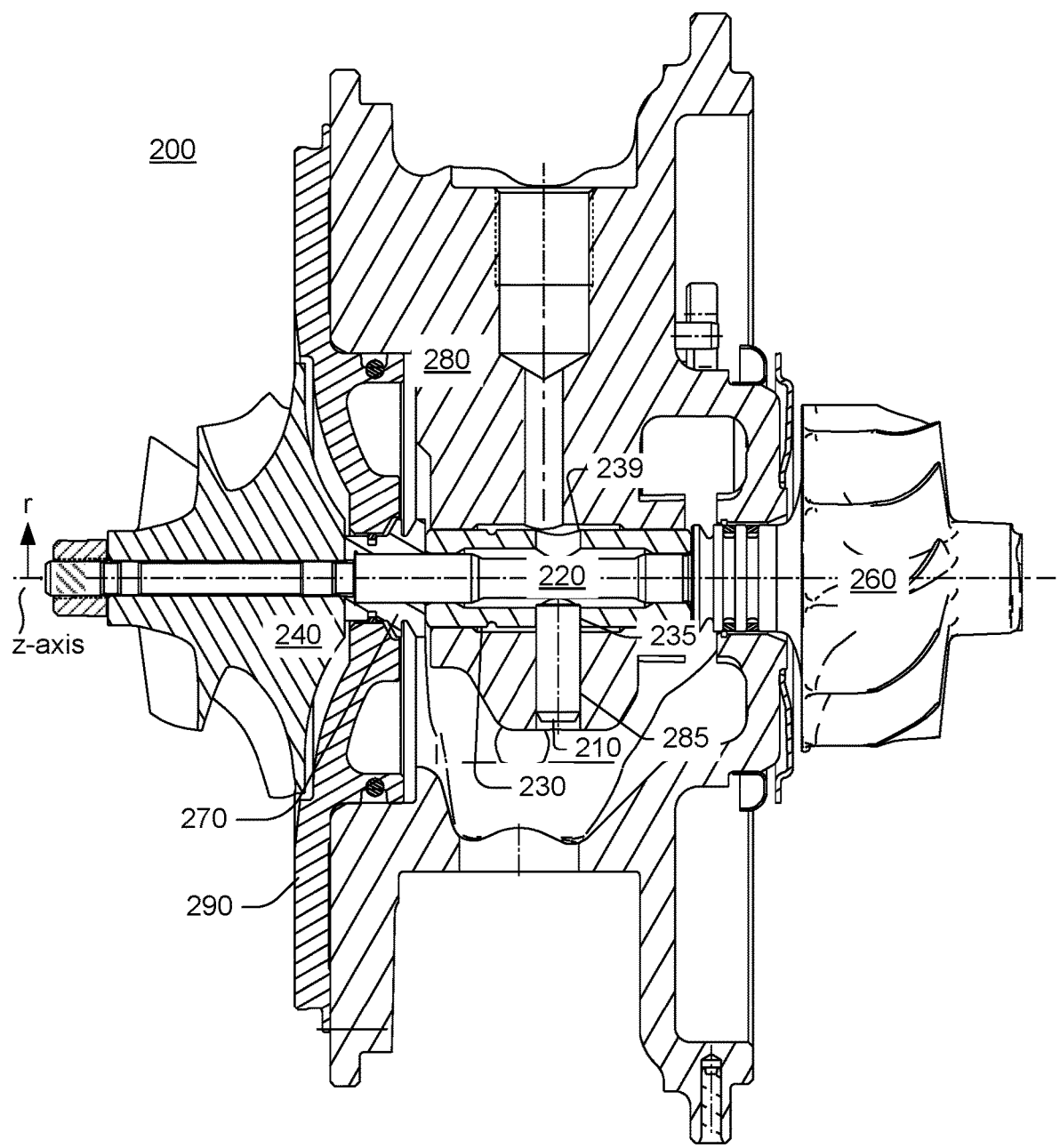
FIG. 2 is a cross-sectional view of an example of a turbocharger assembly and an end view and a cross-section view of an example of a journal bearing.

FIG. 2 shows an example of a turbocharger assembly 200 that includes a shaft 220 supported by a journal bearing 230 disposed in a center housing 280 between a compressor wheel 240 and a turbine wheel 260; noting that a thrust spacer 270 is shown as being positioned between the compressor wheel 240 and a shoulder of the shaft 220 with respect to a bore of a backplate 290. As shown in FIG. 2, the shoulder is formed by a step in diameter of the shaft 220 from a smaller diameter to a larger diameter, forming an annular axial face (e.g., a compressor side face). In the example of FIG. 2, the thrust spacer 270 abuts the axial face of the shaft 220 on one side and abuts an annular axial face of the compressor wheel 240 on an opposing side. The journal bearing 230 is located at least partially in a through bore of the center housing 280 via a locating pin 210. The locating pin 210 may be secured by being screwed into a socket 285 of the housing 280 and may be received by an aperture 235 of the journal bearing 230 to thereby locate the journal bearing 230 in the through bore of the center housing 280. As an example, the locating pin 210 may axially and azimuthally locate the journal bearing 230 in the through bore of the center housing 280.

As an example, the journal bearing 230 may move radially within the through bore of the center housing 280, for example, the journal bearing 230 may move up and down radially with respect to an axis of the locating pin 210 while being limited axially and azimuthally by the locating pin 210 (e.g., the journal bearing 230 may be a semi-floating journal bearing).

The turbocharger assembly 200 of FIG. 2 can be oil cooled as well as air cooled, for example, by being in an environment with ambient air or vehicle engine compartment air. A turbocharger may be cooled via one or more mechanisms. For example, a turbocharger may be cooled via air, water, oil or other fluid. As to lubricant cooling (e.g., oil, whether natural, synthetic, etc.), some tradeoffs exists. For example, if a carbonaceous lubricant reaches too high of a temperature for too long of a time (e.g., consider a time-temperature dependence), carbonization (e.g., also known as coke formation or "coking"), may occur. Coking can exasperate heat generation and heat retention by any of a variety of mechanisms and, over time, coke deposits can shorten the lifetime of a lubricated bearing system. As an example, coke deposits may cause a reduction in heat transfer and an increase heat generation, which may lead to failure of the bearing system.

To overcome coking, a turbocharger may be configured to improve lubricant flow. For example, a pump may pressurize lubricant to increase flow rates to reduce residence time of lubricant in high temperature regions. However, an increase in lubricant pressure can exasperate various types of lubricant leakage issues. For example, an increase in lubricant pressure of a bearing system can result in leakage of lubricant to an exhaust turbine, to an air compressor or both. Escape via an exhaust turbine can lead to observable levels of smoke while escape via an air compressor can lead to lubricant entering an intercooler, combustion chambers (e.g., combustion cylinders), etc.

As to temperatures experienced during operation, they can depend on temperature of exhaust flowing to an exhaust turbine of a turbocharger, which can depend on whether an internal combustion engine is gasoline or diesel fueled; consider, as an example, a diesel engine with exhaust that may be at about 860 degrees C. and consider, as an example, a gasoline engine with exhaust that may be at about 1050 degrees C. Thus, a turbocharger that is in fluid communication with exhaust of a gasoline fueled internal combustion engine can experience higher temperatures when compared to a diesel fueled internal combustion engine. Further, consider the example arrangements 150 and 170 of FIG. 1 where the turbine housing assemblies 152 and 172 are in close proximity to combustion cylinders, which may result in the turbine housing assemblies 152 and 172 experiencing higher exhaust temperatures and/or higher ambient temperatures.

Figure 3:
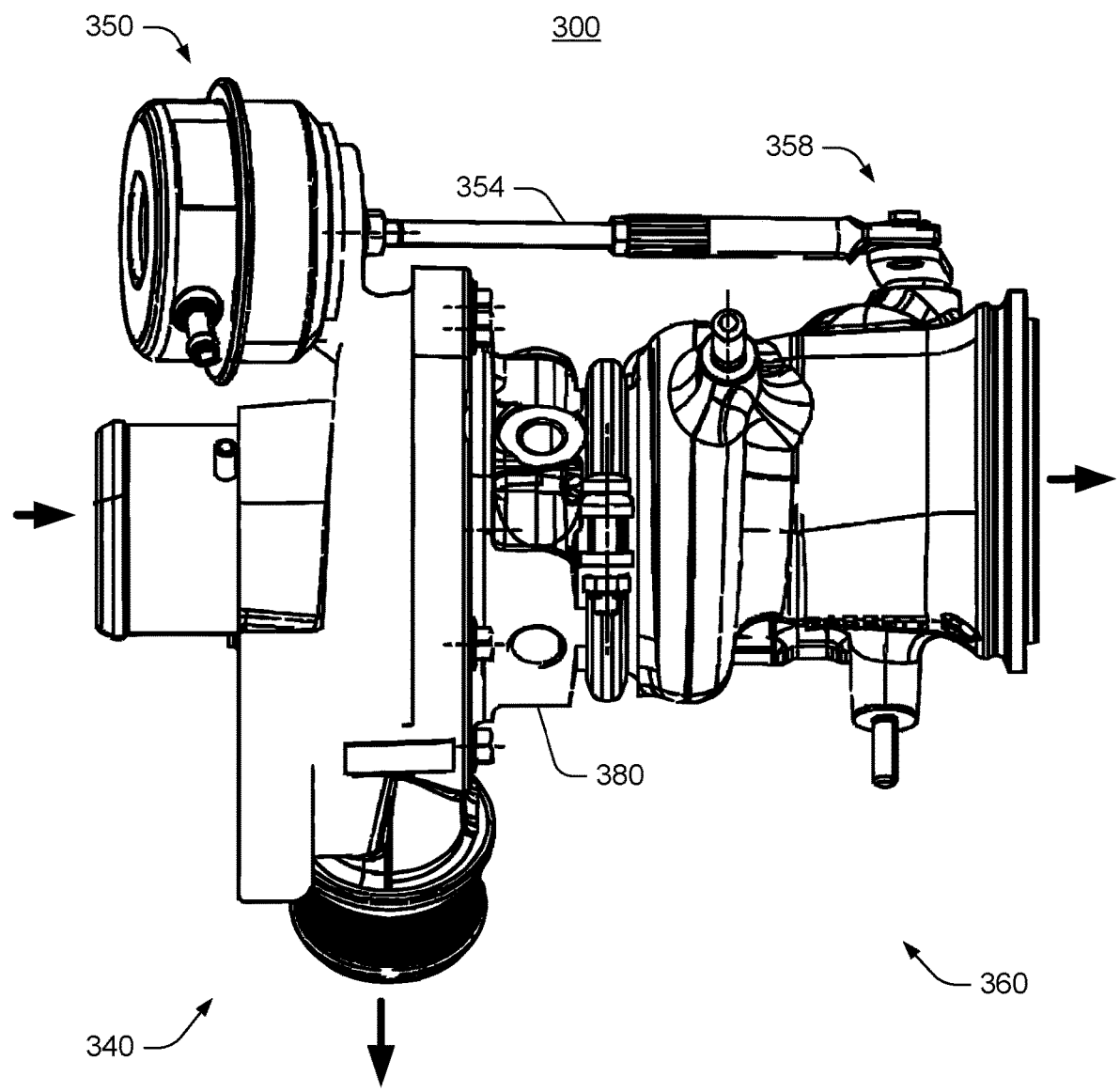
FIG. 3 is a side view of an example of a turbocharger.

FIG. 3 shows an example of a turbocharger 300 that includes a compressor assembly 340 with a compressor housing for a compressor wheel, a turbine assembly 360 with a turbine housing for a turbine wheel, a center housing 380 for a bearing, bearings or a bearing assembly to rotatably support a shaft of a shaft and wheel assembly (SWA), and an actuator 350 with a linkage 354 to a control arm assembly 358 for a wastegate of the turbine assembly 360. The turbocharger 300 can include one or more of the components shown in FIG. 2. In the view of FIG. 2, the exhaust inlet of the turbine assembly 360 is not visible because it is on the opposite side. General directions of flow of air or exhaust are indicated by arrows. The actuator 350 is shown as being mounted to the compressor assembly 340, which can help to reduce temperatures experienced by the actuator 350 (e.g., compared to having the actuator mounted on a turbine housing). The turbocharger 300 can be part of a vehicle such as, for example, the vehicle 101 of FIG. 1. As an example, the turbine assembly 360 may optionally be arranged such as in one of the example arrangements 150 or 170 of FIG. 1.

Figure 4:
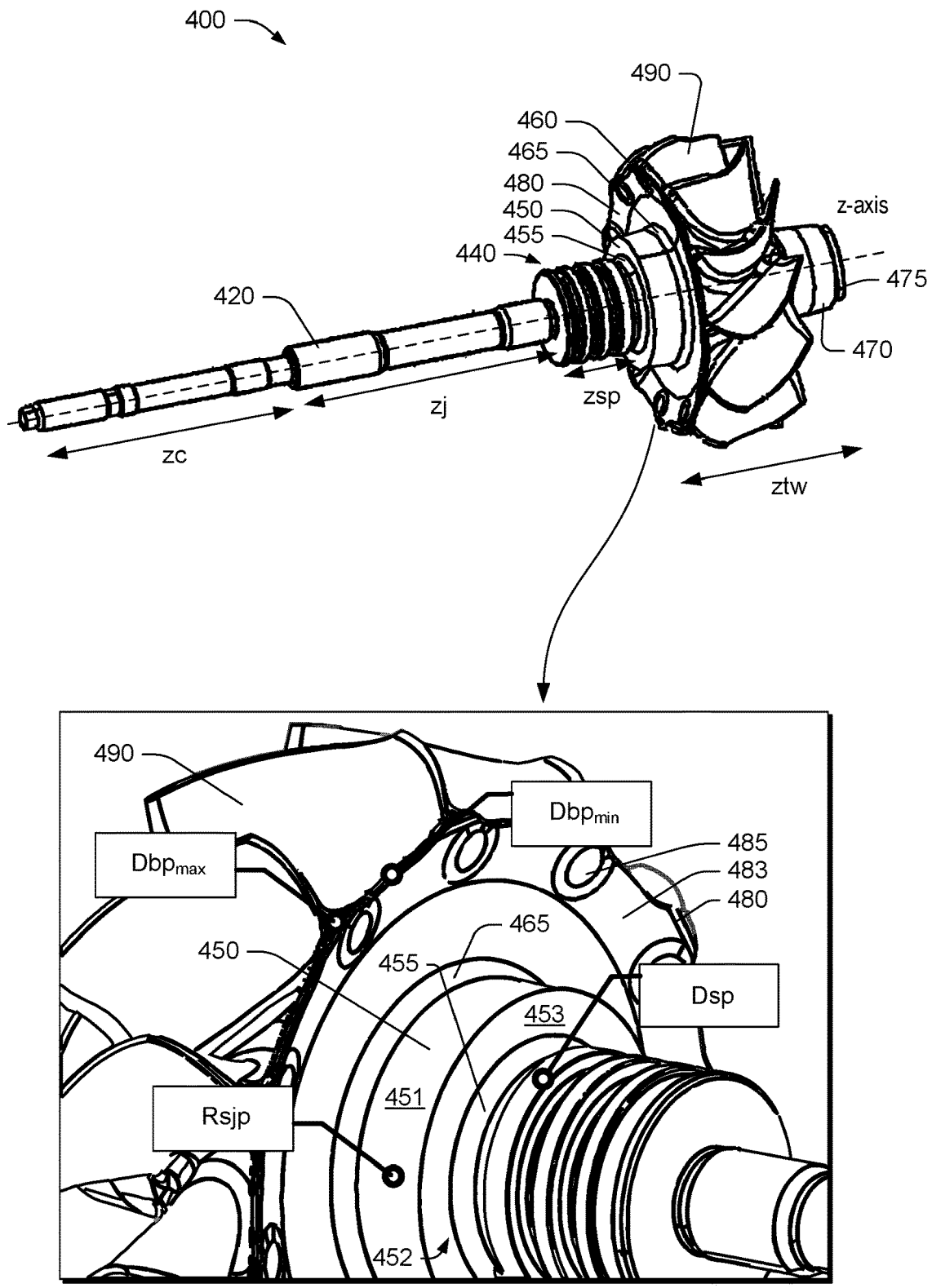
FIG. 4 is a perspective view and an enlarged view of an example of a shaft and wheel assembly (SWA)

FIG. 4 shows a perspective view of a shaft and wheel assembly (SWA) 400. As shown, the SWA 400 includes a shaft 420, a seal portion 440 and a turbine wheel 460 where the turbine wheel 460 includes a nose 470, a backdisk 480 and blades 490. The turbine wheel 460 can be a single, unitary piece of material and referred to as a single component or a single piece. A portion of the turbine wheel 460 can be referred to as a hub. For example, the backdisk 480 can be a part of the hub from which the blades 490 extend. The hub can include the backdisk 480 and the nose and extend the length of the turbine wheel as indicated by an axial length ztw as measured along a rotational z-axis of the SWA 400.

As an example, the seal portion 440 can be formed in part by the turbine wheel 460 and in part by the shaft 420, can be formed by the shaft 420 or can be formed by the turbine wheel 460. As an example, the seal portion 440 can be formed at least in part by the shaft 420. The seal portion 440 can be defined by an outer radius, which may be referred to as a parameter Rshaft, which is a radius that is less than a radius of an outer surface 451 of the shaft joint portion 450 of FIG. 4.

As shown in FIG. 4, a SWA can include a shoulder 452 (or step down) from the turbine wheel 460 toward the shaft 420. For example, in FIG. 4, the shoulder 452 steps down from the outer surface 451 of the shaft joint portion 450 at the radius Rsjp to an outer surface 455, which may be at a radius equal to or approximately equal to that of the seal portion 440. As shown, the shaft joint portion 450 can include a surface 453 that is an annular axial face that can form a portion of the shoulder 452.

As an example, the shaft joint portion 450 can include a shaft joint surface that can be defined in part by a shaft joint radius. For example, consider a shaft joint surface (see, e.g., a surface 457 of FIG. 8) that can be utilized to join a shaft to a turbine wheel (e.g., via welding, etc.). In such an example, the shaft joint surface of the turbine wheel can be a mating surface that mates with a turbine wheel joint surface of a shaft where the two surfaces can be brought into proximity or direct contact and joined (e.g., via welding). As an example, a shaft joint surface may be an annular surface that can be welded to a surface of a shaft to form a SWA.

The SWA 400 can include dimensions such as, for example, axial dimensions for a compressor wheel portion zc, which may include one or more pilot surfaces, a set of threads, etc., and a bearing portion zj, which may include one or more journal surfaces (e.g., a compressor side journal surface and a turbine side journal surface, etc.).

As shown in FIG. 4, the seal portion 440 can include one or more annular grooves that may be configured to receive one or more seal elements (e.g., one or more seal rings). As shown, the seal portion 440 can be defined in part by an axial dimension zsp. As an example, a seal element can be a split ring such as, for example, a piston ring. As mentioned, a SWA may be formed by welding a shaft to a turbine wheel such that the resulting SWA has a shaft and a turbine wheel arranged and fixed along a common rotational axis.

FIG. 4 shows an enlarged perspective view of a portion of the SWA 400 where dimensions are indicated for a backdisk minimum outer perimeter diameter $Dbp_{min}$ (e.g., as an inscribed circle) and for a seal portion diameter Dsp. As shown, the backdisk minimum outer perimeter diameter $Dbp_{min}$ exceeds the seal portion diameter Dsp. For example, consider $Dbp_{min}$ being more than double Dsp.

As an example, a turbine wheel may be defined using diameters, which can be circles that inscribe features of the turbine wheel. For example, where a turbine wheel includes an odd number of blades, a diameter as a line may not be drawn from a leading edge of one blade to a leading edge of another blade. In such an example, diameter can be defined via a circle that inscribes the leading edges of the blades or, for example, mathematically, as twice a radius. A turbine wheel may be defined by an inducer diameter (e.g., associated with exhaust inflow) and an exducer diameter (e.g., associated with exhaust outflow). As an example, an inducer diameter can exceed an exducer diameter. As an example, a trim of a turbine wheel can be defined using its inducer diameter and its exducer diameter. Where diameter is mentioned, it may refer to a diameter of a circle that can be drawn with respect to features of a turbine wheel.

As shown, the backdisk 480 can be a scalloped backdisk such that scallops exist between adjacent connecting regions where each of the blades 490 joins the backdisk 480. As an example, a connecting region can be an extension that extends radially outwardly from the backdisk 480 beyond the diameter $Dbp_{min}$. A scallop can be a radially inwardly curved region that can coincides with an axially lower boundary of a channel defined between two adjacent blades. As an example, a scallop may be defined in a cylindrical coordinate system that includes axial, radial and azimuthal coordinates (e.g., r, z, and Θ). As an example, scallops of a backdisk can be of the same shape. For example, where a turbine wheel includes eleven blades, the turbine wheel can include eleven channels and eleven scallops where the blades are of common dimensions, the channels are of common dimensions and the scallops are of common dimensions.

As an example, a balancing process may alter one or more dimensions of a turbine wheel, for example, via removal of material. For example, consider removal of material from the nose 470 of the turbine wheel 460 of the SWA 400. As shown, the nose 470 has an outer diameter that is less than an outer diameter of the backdisk 480. Another option is to remove material from the backdisk 480; however, the backdisk 480 supports the blades 490. Where material is removed from the backdisk 480, one or more problems may arise as to mechanical support for the blades 480 and/or overall integrity of the turbine wheel 460 during operation. As an example, material may be removed from the shaft joint portion 450, for example, at one or more of the surfaces 451 and 453). In such an example, material removal may have minimal impact on the backdisk 480 as to its ability to support the blades 490.

Balancing that relies on removal of material from a nose can be limited in effect due to the radius from the rotational axis at which the material is removed. For example, where a larger radius is available for balancing, lesser material may be removed to achieve the same balance effect as removing more material at a smaller radius; noting that aerodynamic, mechanical and/or thermal phenomena can impact one or more of balance, integrity, performance, etc., of a turbine wheel and hence a turbocharger. As to use of a shaft joint portion for removal of material for balancing, effectiveness can depend on the shape and/or the size of the shaft joint portion. For example, a larger radius shaft joint portion can provide an ability to help reduce an amount of material to be removed to achieve acceptable balance when compared to a smaller radius shaft joint portion. However, a larger radius shaft joint portion can increase mass of a turbine wheel, which may be undesirable in various circumstances.

As to balancing, various techniques exist, which can include component balancing techniques and assembly balancing techniques. For example, consider balancing a turbine wheel as a component or balancing a SWA or balancing a rotating assembly where a compressor wheel is fit to a SWA. In general, to achieve desired operational specifications, balancing is performed (e.g., using a balancing rig, etc.). As an example, balancing can include one or more of balancing a turbine wheel inboard side, balancing a turbine wheel outboard side, balancing a compressor wheel inboard side, balancing a compressor wheel outboard side, assembling a rotating group as a rotor assembly, checking balance the rotor assembly and balancing of one or more sides of the compressor wheel and/or one or more sides of the turbine wheel, assembling a center housing rotating assembly (CHRA) and performing a final balance using a high-speed balancing machine. In general, balancing involves removal of material, which as mentioned, may be material of a turbine wheel where material may be removed from one or more portions of the turbine wheel.

A turbine wheel can be designed in a manner that accounts for one or more issues associated with balancing stock, which is material that can be removed to adequately balance a turbine wheel. During design, a decision can be made as to where to locate balancing stock that can provide for a sufficient amount of balancing capacity (BC). Balancing stock may be at one or more locations such as at a nose, at a backdisk, which can include at a shaft joint portion (e.g., being contiguous with a backdisk). As to design, a nose may serve various purposes, where one or more of those purposes may limit breadth of design. As mentioned, a backdisk supports blades such that removal of material of a backdisk at or near its outer perimeter may be limited by constraints (e.g., stress, integrity, etc.). In various examples herein, a turbine wheel can include features that provide for removal of material for balancing where constraints are met (e.g., stress, integrity, etc.), optionally while reducing polar inertia.

As explained herein, turbine polar inertia represents resistance for turbocharger rotation acceleration, which can be a contributor to the so-called turbo effect. To reduce turbo effect, as an example, it is possible to provide a smaller turbine wheel, which exhibits lesser polar inertia. Such a turbine wheel can provide an increase in responsiveness such that it is swifter and exhibits lesser response lags during transients. While smaller size (e.g., maximum diameter) may reduce polar inertia, a turbine wheel size may be a specification of a turbocharger that is for meeting one or more performance goals. Where maximum diameter is specified (e.g., per a trim, a housing, etc.), one or more approaches may be taken to provide for an improved polar inertia while providing adequate material for balancing (e.g., balance stock) and while meeting criteria as to stress and/or integrity.

As explained herein, an approach to turbine wheel design can aim to optimize size and balancing capacity (BC). For example, an approach can provide a specially designed backdisk of a turbine wheel that aims to include balance stock concentrated on a relatively small diameter where the turbine wheel can substantially reduce turbine wheel polar inertia.

As explained, as a turbine wheel is to operate under severe conditions (e.g., high temperature, high speeds, etc.), it has to be capable from a structural integrity point of view while also providing enough balancing capacity (BC); however, an increase in BC can increase the turbine wheel weight and its polar inertia.

Various turbine wheels described in examples herein are shaped in a manner that provides more optimal polar inertia (e.g., less turbo effect) while providing adequate integrity (e.g., stress handling capacity, etc.). In various examples, integrity is bolstered through three-dimensional backdisk design where the backdisk includes shape elements, which are positioned to strengthen the backdisk. As an example, such shape elements, where included, can be referred to three-dimensional bolster regions (e.g., 3D bolster regions).

As shown in the example of FIG. 4, an exhaust turbocharger turbine wheel 460 can include a hub 465 that includes a nose 475, a backdisk 480, a shaft joint portion 450 (e.g., as part of the backdisk 480) and a rotational axis (z-axis); blades 490 that extend from the hub 465 to define exhaust flow channels where each of the blades 490 includes a leading edge, a trailing edge, a hub profile, a shroud profile, a pressure side, and a suction side; where the backdisk 480 includes an outer perimeter radius measured from the rotational axis of the hub 465 (see, e.g., $Dbp_{min}$ or $Dbp_{max}$), an intermediate radius at an outer perimeter of the shaft joint portion 450 measured from the rotational axis of the hub 465 (see, e.g., the radius Rsjp at the surface 451), and an annular recess 483 disposed between the intermediate radius and the outer perimeter radius and defined in part by three-dimensional bolster regions 485, where each of the three-dimensional bolster regions 485 includes a footprint and a height measured at least in part in a direction of the rotational axis of the hub 465. For example, where the rotational axis is the z-axis as shown in FIG. 4, the height of the three-dimensional bolster region 485 can be measured at least in part as a difference between two z-coordinates (e.g., z=0.05 and z=0.07, such that a height can be 0.02). As an example, a height may be measured in a direction that is normal to a footprint, which may be a projected footprint. For example, consider a footprint that is projected onto a surface that is substantially coincident with a backdisk surface about a three-dimensional bolster region. In such an example, a normal may be defined and a height of a three-dimensional bolster region may be measured along the normal. As an example, a balancing process may optionally include removing material that causes the height of a corresponding three-dimensional bolster region to be diminished. As an example, material may be removed from one or more portions of a turbine wheel. For example, material may be removed from a nose, a backdisk site and/or backdisk sites, where a backdisk site can include a shaft joint portion site.

As to the shaft joint portion 450, it is shown as being substantially cylindrical at the surface 451 and at the surface 455. As an example, the backdisk 480 can be defined as a lower portion of the hub 465 that includes at least part of the shaft joint portion 450 and that extends outwardly from the radius of the surface 455 to a maximum outer perimeter of the backdisk 480 (see, e.g., $Dbp_{max}$).

As explained, the shaft joint portion 450 can join the seal portion 440, which may be an integral part of the shaft 420. As an example, the seal portion 440 can be welded to the shaft joint portion 450 to form a welded joint that is to permanently join the shaft 420 and the turbine wheel 460 to form a shaft and wheel assembly (SWA).

With reference to FIG. 2, a seal portion is shown as being part of the shaft 220 and as being joined to the turbine wheel 260 to form a SWA. The seal portion can include one or more annular grooves as shown in FIG. 2 where one or more corresponding seal elements (e.g., seal rings) can be disposed at least in part therein to form a seal or seals between a lubricant region of the center housing 280 and an exhaust region in which the turbine wheel 260 is disposed. As shown, the center housing 280 includes a turbine side bore in which the seal portion and the seals are seated. The bore includes a bore wall where the seals may contact the bore wall (e.g., consider piston rings as split rings that can be compressed during installation and then expand once installed to form seals).

As shown in FIG. 2, the turbine wheel 260 has a 2D backdisk that includes a flat, annular portion and a contour that transitions from the flat, annular portion to a shaft joint portion. As shown, a 2D backdisk of the turbine wheel 260 transitions from a large diameter to a small diameter and does so without an annular recess or with an annular recess that has a 2D profile in a z,Θ-plane that is constant from 0 degrees to 360 degrees about the rotational axis of the turbine wheel 260. The turbine wheel 260 does not include a 3D bolster region that would make the backdisk of the turbine wheel 260 three-dimensional (e.g., not representable by a single cross-sectional profile). In FIG. 2, the shaft 220 and its seal portion are of lesser diameters than the maximum outer diameter of the turbine wheel 260. In general, a shaft or a seal portion are not of a diameter equal to or greater than a maximum outer diameter of a turbine wheel as such an approach would result in a correspondingly large mass of the shaft and the seal portion compared to a smaller diameter shaft and smaller diameter seal portion. As shown in FIG. 2, the SWA can be defined from right to left as generally stepping down in diameter; noting that some variations can be present between journals and necks and pilots and necks. For example, the shaft 220 includes a turbine side journal, a compressor side journal and a neck therebetween. Further, the shaft 220 includes two pilots along a compressor wheel portion with a neck therebetween. As an example, a shaft can include one or more necks that may aim to reduce mass of the shaft.

As an example, a shaft may be made of a material that is the same as that of a turbine wheel or that is different from that of a turbine wheel. Where materials differ, the materials can generally be amenable to welding such that a SWA can be formed. As mentioned, a compressor wheel may be manufactured from a material that has a lesser specific gravity than a material of a turbine wheel. In general, a compressor wheel experiences operational temperatures that are less than those of a turbine wheel. In FIG. 2, a rotating assembly can include the shaft 220 and the turbine wheel 260 as an SWA along with the compressor wheel 240 and a nut (e.g., fora compressor wheel with a through bore). As an example, a so-called boreless compressor wheel may be utilized where the compressor wheel can join to a shaft without use of an end nut. In FIG. 2, as the bearing 230 is located by the locating pin 210, the bearing 230 does not rotate or rotates minimally (e.g., a few degrees). As an example, a thrust collar can be included as part of a turbocharger and be located between a bearing and a compressor wheel. Such a thrust collar may be configured to rotate, which may provide for lubricant slinging (e.g., to help reduce flow of lubricant from a center housing space to a compressor wheel space). As an example, a bearing may be a journal bearing or a rolling element bearing. A rolling element bearing can include rolling elements (e.g., rollers, balls, etc.) and an outer race and optionally an inner race.

A rotating assembly can have a mass defined by a sum of individual masses of components that make up the rotating assembly. Under the influence of gravity, a rotating assembly may be settled in a turbocharger. For example, journal surfaces of a shaft may rest against journal surfaces of a bearing or bearings. During an operational start-up phase, lubricant may be pumped into a center housing and cause some amount of hydrodynamic support, which may lift the rotating assembly. As mentioned, flow of exhaust to an exhaust turbine disposed in a turbine housing can be a driver for rotation of a rotating assembly where mass and other factors can determine how much exhaust must flow before rotation commences.

Rotor blade speed of a turbine wheel has an influence on power developed by a turbine assembly and hence power developed by a turbocharger. One factor that impacts turbine dynamics is polar inertia of a rotating assembly (e.g., SWA, compressor wheel, etc.). Polar inertia can limit the rate of change of a rotating assembly during transients in operation of an internal combustion engine. Polar inertia can therefore impact so-called "drivability" of a vehicle with a turbocharged internal combustion engine. A substantial fraction of the polar inertia of a rotating assembly resides in the turbine wheel, which is manufactured of a material that tends to be heavier (e.g., denser or higher specific gravity) than that of a compressor wheel, for example, to provide for a higher level of temperature resistance. As an example, a turbine wheel can be made of a nickel alloy. For example, consider a NiCrFe-based alloy (e.g., HASTALLOY™ material, INCONEL™ material, etc.) or another alloy. In contrast, a compressor wheel may be made of a lighter material such as, for example, aluminum or an aluminum alloy. A turbine wheel material may have a specific gravity that is double or more than double that of aluminum (approximately 2.7 versus approximately 8.4 for INCONEL™ 625 material). As such, a turbine wheel can be selected, designed, etc., as a result of one or more tradeoffs between factors that can include performance, inertia, operation life and durability.

Tradeoffs between efficiency and inertia may be taken involving moving toward low inertia with lesser efficiency. Operational life and durability in a hot gas environment can also impose limitations on various factors (e.g., blade shape) that may result in lesser aerodynamic efficiency.

As mentioned, polar inertia can be a resistance to turbocharger rotation acceleration and a contributor to the so-called "turbo effect". As such, in various applications (e.g., vehicle, etc.), a need exists for a relatively low turbine wheel polar inertia ($I_0$) for improved turbocharger transient response.

Various turbine wheel backdisks can be described as being 2D in that a cross-section in a z,Θ-plane is constant about the z-axis of rotation. For example, a backdisk can be defined by a body of revolution (or solid of revolution) of a 2D plane. Noting that, above such body, the blades are 3D in shape. A 2D backdisk allows for a focus on a single profile that adequately meets various goals (e.g., mass, performance, machinability, integrity, etc.). Such an approach does not necessarily account for blades, which define channels for flow of exhaust. A blade can be defined as having a pressure side and a suction side where the pressure side can be generally concave and the suction side can be generally convex. During operation, forces experienced by the blades (e.g., forces of respective sides, etc.) can be transferred to a backdisk. Thus, where a blade meets a backdisk, such as within an inducer portion, forces can differ between the pressure side and the suction side. As to channels, they are regions where no blade joins the backdisk. A channel region may require lesser support than a region where a blade joins the backdisk. For example, in a channel region, a 3D backdisk can be scalloped radially inwardly such that a minimum outer perimeter radius of a 3D backdisk exists in a channel region; while a maximum radius of a 3D backdisk exists in a region where a blade joins the 3D backdisk. While scalloping can reduce mass, other considerations exist that can place some limitations on an amount of scalloping.

As an example, a 3D turbine wheel backdisk can include regions of material that can improve integrity while optionally being available for machining for purposes of balance (e.g., as balance stock). Such regions of material can be referred to as bolster regions. As an example, a bolster region may be formed with a predefined shape. For example, consider a bolster region that is formed with a shape that can be defined by a footprint and a volume. As an example, a footprint may be approximately circular, oval, elliptical, etc. A footprint may be defined as a projection, for example, in a r,Θ-plane; noting that a footprint can include variations in a z-direction. As an example, a bolster region may be formed with a shape similar to a droplet of liquid on a surface (e.g., viscous liquid) where the droplet has a surface shaped by a balance of energy (e.g., consider surface tension). As an example, a bolster region can be defined in part by a diameter and a height. For example, consider a bolster region with a footprint defined by a diameter and a volume defined by a curve that rises from a perimeter of the footprint to a maximum height. As an example, such a curve may be defined by a mathematical equation. As an example, a bolster region may be defined by a plurality of curves that rise from a perimeter of a footprint to a common height at a point of the bolster region.

As an example, a bolster region can be defined by a radius from an axis of rotation of a turbine wheel (e.g., z-axis). As an example, a turbine wheel can have a 3D backdisk with scalloped regions and bolster regions. Such a turbine wheel can be a reduced mass turbine wheel that has a relatively low polar inertia.

As mentioned, a turbine wheel can operate under severe conditions (e.g., high temperatures, high rotational speeds, exhaust flow transients, etc.). As such, a turbine wheel has to be capable from a structural integrity point of view and a turbine wheel also has to provide a desirable level of balancing capacity (BC).

Balancing capacity (BC) has an impact on turbine wheel mass and $I_0$. An increase in BC can increase turbine wheel mass and $I_0$. Balancing of a turbine wheel can provide for balancing of the turbine wheel itself and/or one or more components of a SWA (e.g., a shaft) and/or one or more components assembled on an SWA (e.g., a compressor wheel, one or more races of a bearing, a nut, etc.). Again, as a rotating assembly may be expected to rotate in excess of 100,000 rpm or even in excess of 200,000 rpm, balancing is desirable. A balancing process may be performed with respect to a balancing rig or balancing machine. A balancing process can include measuring unbalance and removing material, which may be performed iteratively until a desired level of balance (e.g., minimal unbalance) is achieved.

For a turbine wheel, a decision as to where to locate balancing stock (e.g., extra material that can be cut away during a balancing process) that provides for a sufficient level of BC is a decision that implicates other factors, which can influence various turbine performance parameters.

As an example, a turbine wheel can include material for BC that is accommodated within a radius of a turbine wheel axis, which can provide for a relatively slim backdisk (e.g., at greater radii), which may reduce polar inertia; however, a reduction of the backdisk thickness towards to a manufacturing limit can leads to excessive thermal and centrifugal (e.g., due to backdisk bending) stresses on at or proximate to its outer diameter. As such, the ability to reduce backdisk thickness tends to be limited for sake of integrity, stress, durability, etc., of a turbine wheel.

As explained, a turbine wheel can include 3D bolster regions (e.g., 3D shape elements) that are shaped, sized and positioned to reinforce a backdisk of the turbine wheel. Such bolster regions can be positioned at otherwise high stress regions of a "slim" backdisk where such high stress regions can be close to the outer diameter of the backdisk. Such an approach, through use of bolster regions, can optionally allow for further backdisk thickness reduction, which may provide for maximal utilization of a turbine wheel's BC that is at a smaller radius. Such an approach can aim to provide for a reduction in polar inertia (e.g., a reduction in $I_0$).

As an example, a "smart" 3D backdisk bolster region (e.g., a reinforcement region) can be located precisely at a high stress region, for example, to increase backdisk stiffness at the place where it is particularly needed to support turbine wheel durability, without a substantial increase in turbine wheel mass or turbine wheel polar inertia; noting that an overall decrease in turbine wheel mass and/or turbine wheel polar inertia may be achieved as the bolster region approach can allow for a slimmer backdisk that is of a lesser mass. Such a 3D backdisk bolster region approach can improve turbine wheel performance and hence turbocharger performance in comparison to turbine wheels that rely on an axi-symmetrical 2D approach to reinforcement.

As to considerations pertaining to mass, size (e.g., radius), balancing capacity (BC), and polar inertia ($I_0$), example equations 1, 2, 3 and 4 are presented below:

$$BC = mass * radius \quad (1)$$

$$I_0 = mass * radius * radius \quad (2)$$

$$I_0 = BC * radius \quad (3)$$

$$I_0/BC = radius \quad (4)$$

As shown in the equations above, $I_0$ is proportional to the square of the radius (equation 2); whereas, BC is proportional to the radius (equation 1). Thus, there can be an $I_0$–BC tradeoff. For example, consider a curve in the form of equation 3 or equation 4. It is evident that $I_0$ of a given BC is smaller if placed at a smaller radius. As an example, a turbine wheel can include a backdisk where there can be a range of radii for material that contributes to BC. BC accommodated close to a turbine wheel axis of rotation can allow for a relatively slim backdisk that can $I_0$. However, as mentioned, a gradual reduction of backdisk thickness toward manufacturing limits can lead to excessive thermal and centrifugal (e.g., due to backdisk bending) stresses on its outer diameter and has to be limited for the sake of turbine wheel durability. In some examples, a turbine wheel can be designed where the polar inertia is improved without a need to include bolster regions; however, where stresses do approach limits, in various examples, a turbine wheel can be designed with bolster regions that are positioned at high stress points, which may be determined via testing without bolster regions, numerical simulation, etc. For example, a turbine wheel backdisk design may be achieved by determining a suitable size and shape without bolster regions, determining high stress points and comparing those to acceptable limits, and, based on such comparing, determining whether and/or where to position bolster regions to thereby improve integrity of a turbine wheel. Once positions are determined, additional parameters as to size, shape, etc., of the bolster regions may be determined and an appropriate turbine wheel manufactured.

As an example, a backdisk of a turbine wheel can include bolster regions that are shaped as 3D shape elements where such elements can be positioned, sized and shaped to help to reinforce the turbine wheel at otherwise high stress regions, which tend to be close to the backdisk outer perimeter. Such an approach can, for example, provide for further thickness reduction and then for maximal utilization of BC on a relatively small radius turbine wheel for $I_0$ reduction.

As an example, a turbine wheel can include a 3D backdisk with reinforcement provided by material at a plurality of bolster regions that are positioned at high stress regions. In such an example, there can be a stiffness increase limited to the regions where an increase in stiffness is beneficial to support turbine wheel durability and without or with limited increase in turbine wheel mass and/or $I_0$ when compared to an axisymmetric 2D backdisk reinforcement approach.

Figure 5:
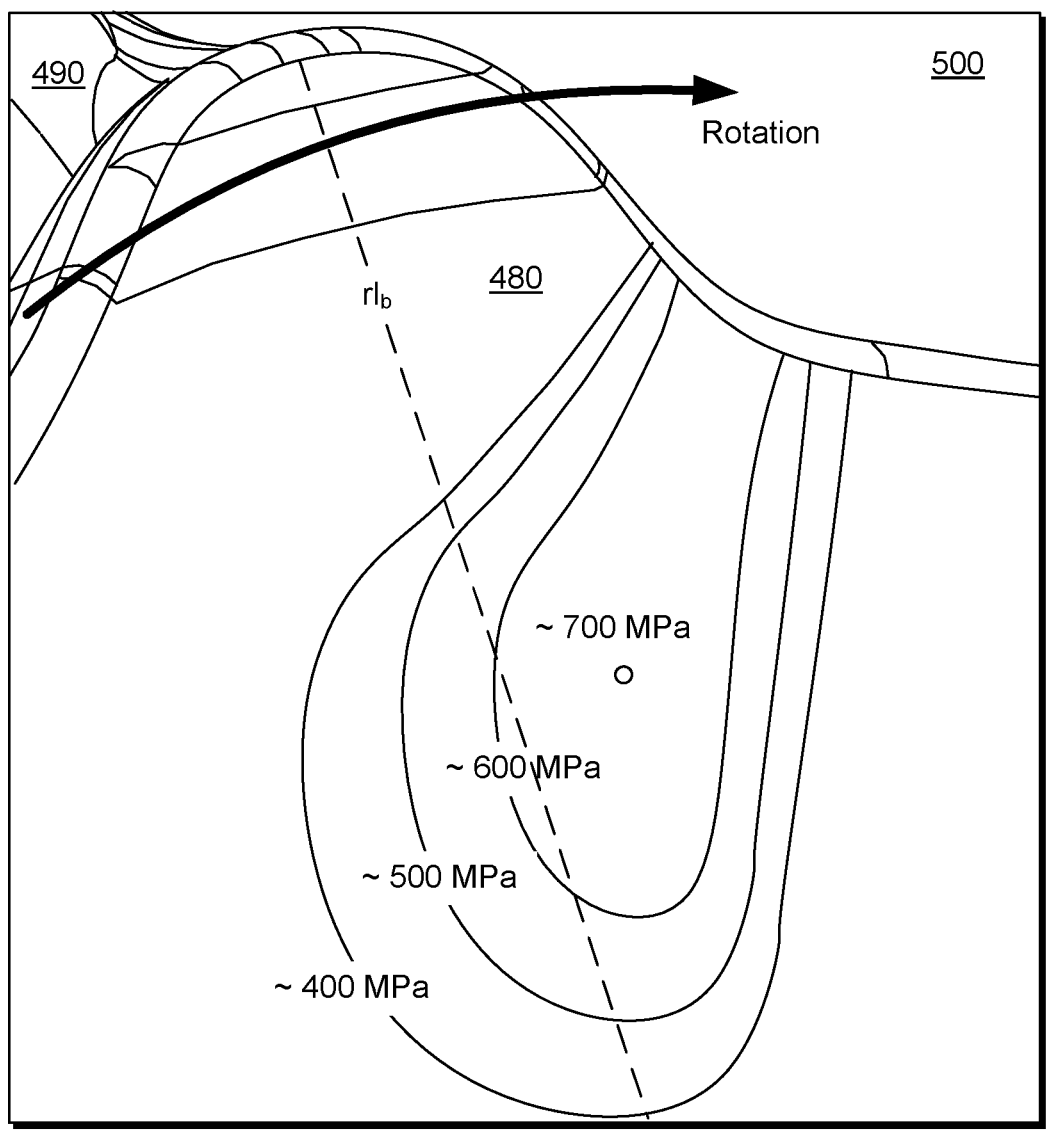
FIG. 5 is an example of a stress plot with respect to a portion of a turbine wheel.

FIG. 5 shows an example of a stress plot 500 as generated using a finite element model of a turbine wheel with the backdisk 480 where the backdisk 480 does not include 3D bolster regions. The backdisk 480 includes individual regions where individual blades join the backdisk 480, referred to as blade joining regions (e.g., or extensions), and regions between the blade joining regions, referred to as channel regions. As shown in the example of FIG. 5, a maximum stress is at a radius that is less than a maximum radius of a blade joining region's outer perimeter and that is less than a minimum radius of a channel region's outer perimeter, which may be a minimum radius defined by a scallop. As indicated in the stress plot 500, a high stress contour extends from the maximum stress toward the perimeter of the backdisk 480 in a direction that is toward the channel region rather than toward the blade joining region. The maximum stress point shown in the stress plot 500 is also offset with respect to the pressure side and the suction side of the blade 490 shown in FIG. 5; noting a direction of rotation indicated by a curved arrow. Specifically, the maximum stress point is offset from a radial line between the rotational axis (z-axis) of the turbine wheel and the point where the blade 490 joins the backdisk 480 ($rl_b$) toward the suction side of the blade 490, which is away from the pressure side of the blade 490.

Figure 6:
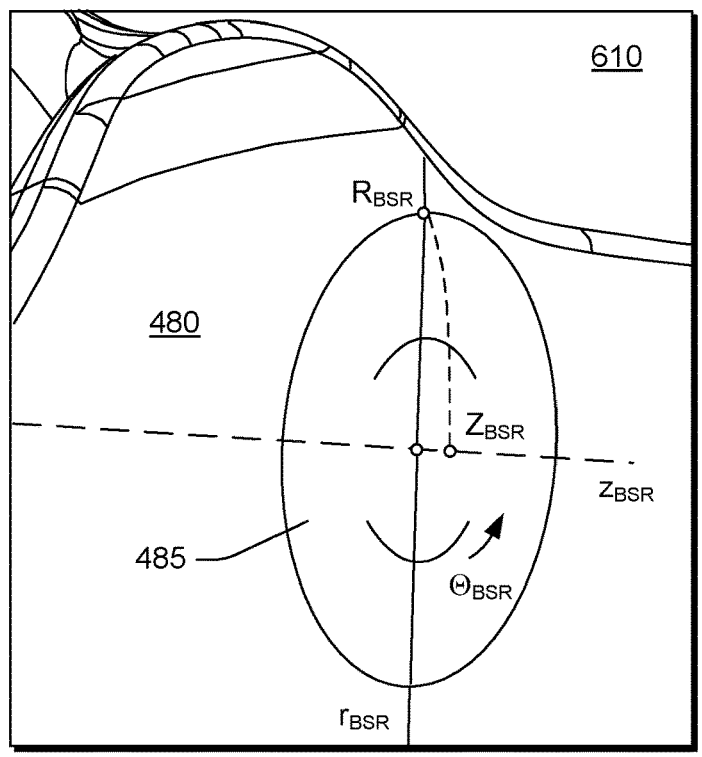
FIG. 6 is an example of a plot of a three-dimensional bolster region of a backdisk of a turbine wheel and an example of a plot of a fillet region.
Figure 6:
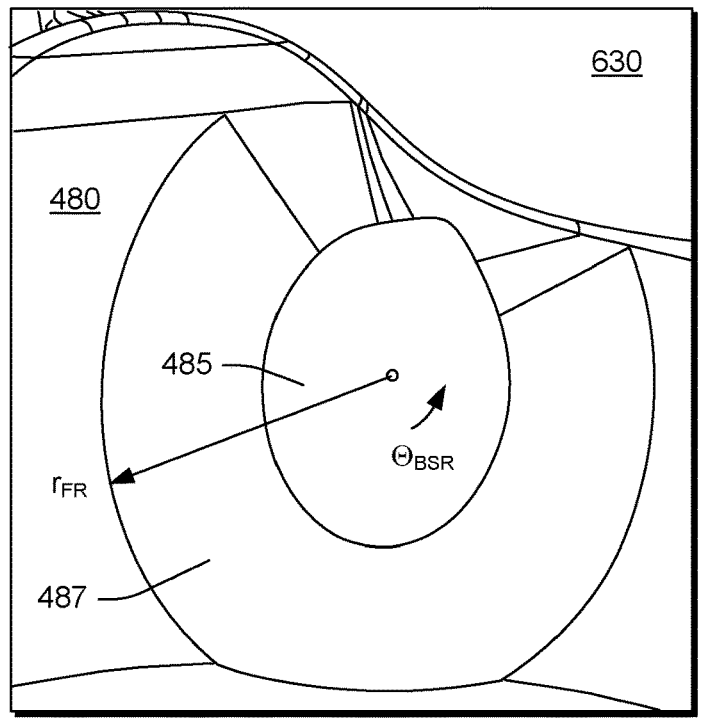

FIG. 6 shows example plots 610 and 630 as to features that can be included with a 3D backdisk. Specifically, the plot 610 shows a 3D bolster region 485 that is positioned over the maximum stress point identified in the stress plot 500 of FIG. 5. In the plot 610, the 3D bolster region 485 can be defined, for example, with respect to a cylindrical coordinate system, shown with a $z_{BSR}$ axis, a $r_{BSR}$ axis and an azimuthal angle $\Theta_{BSR}$. As shown, the 3D bolster region 485 can be defined via a shape radius $R_{BSR}$, an axial shape height $Z_{BSR}$ and an azimuthal span from 0 degrees to 360 degrees.

In FIG. 6, the 3D bolster region 485 extends outwardly in a z-direction with respect to the rotational axis of the turbine wheel 460 in a manner that is elevated above the maximum stress point. The 3D bolster region 485 has a droplet shape (e.g., as a droplet on a surface) with a perimeter that defines a footprint and elevation or height, which may be compared to a backdisk without the 3D bolster region 485. As an example, the 3D bolster region 485 may be defined as being a part of a 3D body (e.g., a part of a sphere, a part of a spheroid, a part of an ellipsoid, etc.).

As to the plot 630, it shows a fillet region 487 that is present about the perimeter of the 3D bolster region 485, which may be defined, for example, using the cylindrical coordinate system illustrated in the plot 610 (e.g., a local cylindrical coordinate system that is local to an individual 3D bolster region). The fillet region 487 can provide for a smooth transition between a surface of the backdisk 480 and the 3D bolster region 485. For example, the fillet region 487 can be a transition region that is shaped for one or more purposes such as, for example, one or more of diminishing corners, diminishing aerodynamic resistance, diminishing impact of material removal, diminishing stress, diminishing thermal gradients, etc. As to corners, consider a 3D bolster region as being shaped such that it forms a corner at its perimeter. In such an example, a fillet region can provide a smooth transition between a surface of a backdisk and the 3D bolster region to diminish or eliminate the corner at the perimeter (e.g., for improved stress, improved aerodynamics, etc.).

As an example, a 3D bolster region can be shaped with a fillet region. As an example, a fillet region may be a relatively annular region that spans a distance from a perimeter of a shape that defines at 3D bolster region. For example, consider a distance span that is in a range from an inner radius to an outer radius $r_{FR}$ from approximately 0.5 mm to approximately 10 mm. In the example of FIG. 6, the fillet region 487 may be approximately 2 mm to approximately 6 mm at its widest point from the perimeter of the shape that defines the 3D bolster region 485 shown in FIG. 6. As indicated, the fillet region 487 can make alter the shape of the perimeter. For example, the perimeter shown in FIG. 6 is oval in shape without the fillet region 487 and, with the fillet region 487, the perimeter is substantially oval in shape as a deviation is present proximate to a scallop of the backdisk 480. As mentioned, a fillet region can provide for one or more of reduction in stress, reduction in corrosion, reduction in aerodynamic resistance, reduction in thermal effects, etc.

Figure 7:
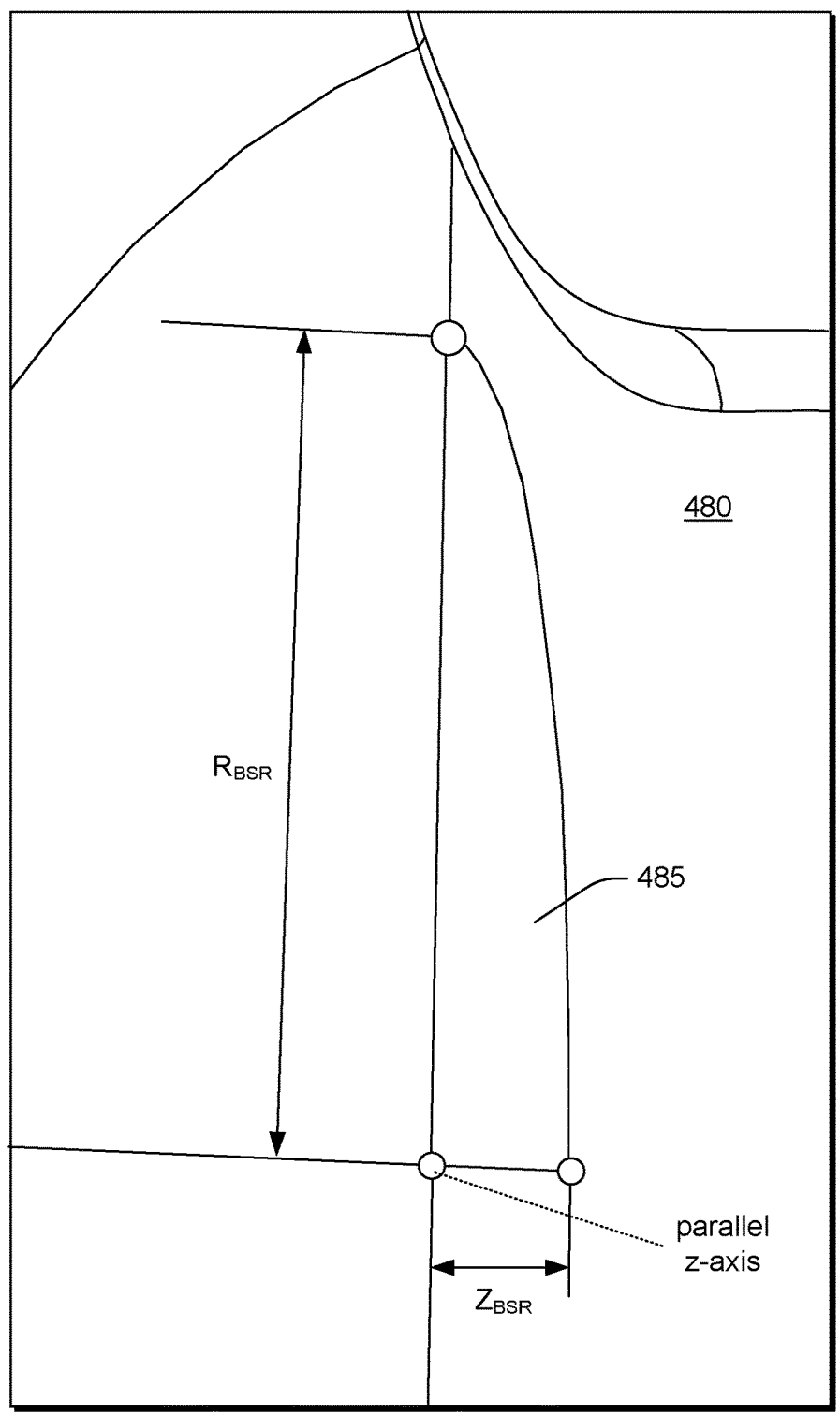
FIG. 7 is an example of a plot of a portion of a three-dimensional bolster region of a backdisk of a turbine wheel.

FIG. 7 shows an example of a profile of the 3D bolster region 485 of the plot 610 of FIG. 6. As shown, the profile can be defined by various dimensions including, for example, a shape radius $R_{BSR}$ along the axis $r_{BSR}$ and a shape height or shape elevation $Z_{BSR}$ along the axis $Z_{BSR}$. The shape height ($Z_{BSR}$), which may be referred to as a shape elevation, can be measured at least in part in a direction that is the same as an axis of rotation of a turbine wheel. In FIG. 7, a dotted line represents a line that is parallel to a z-axis (e.g., rotational axis of a turbine wheel). As shown in FIG. 7, the shape height ($Z_{BSR}$) includes a component that can be measured with respect to the dotted line.

In the example of FIG. 7, various points are indicated where the shape height or shape elevation can be a maximum shape height or shape elevation that is positioned at or proximate to a maximum stress point as may be determined using one or more techniques such as, for example, finite element modeling. As mentioned, the addition of material at particular locations of a backdisk can provide for one or more benefits, which can include reduced stress.

Figure 8:
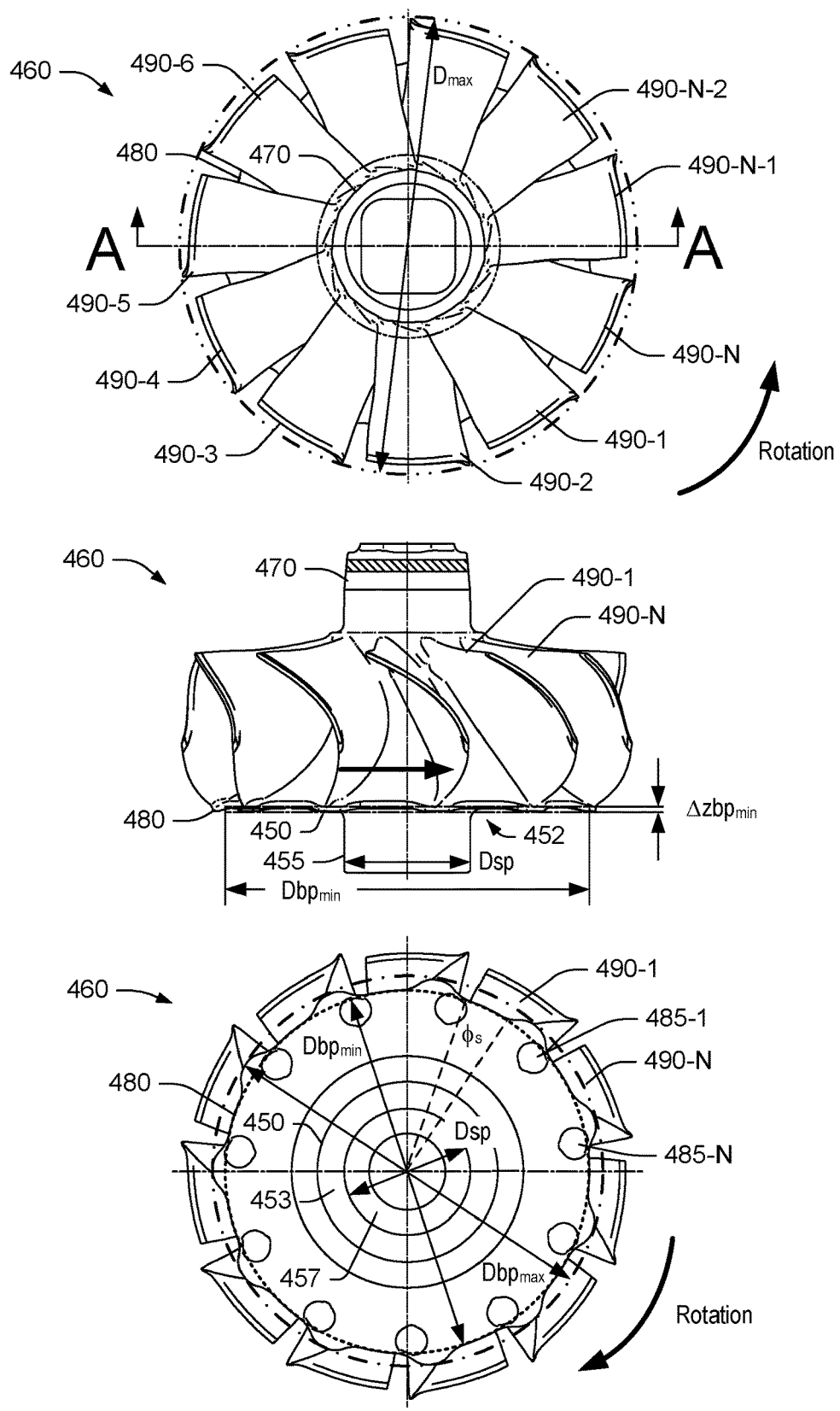
FIG. 8 is a series of views of an example of a turbine wheel.
Figure 9:
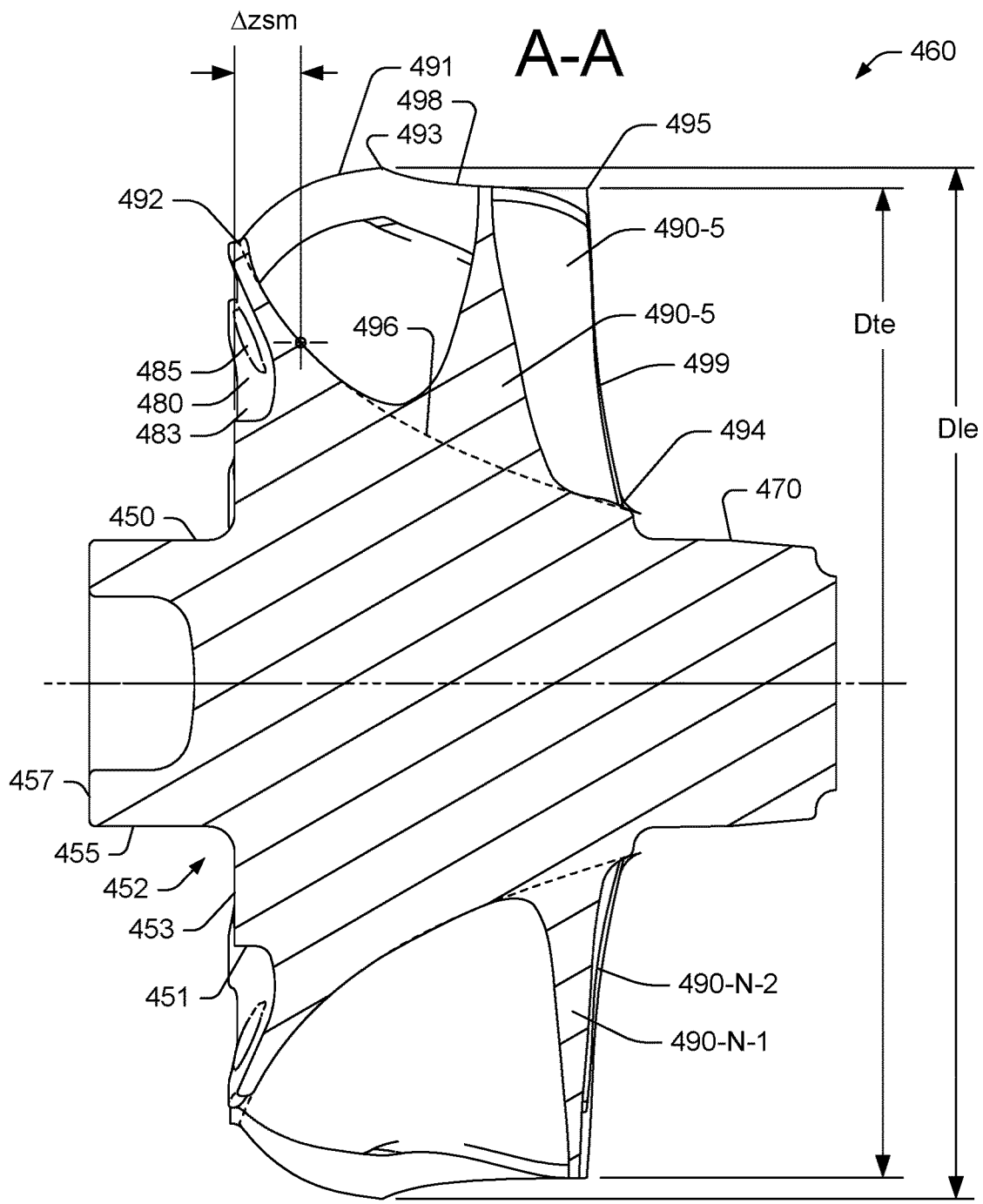
FIG. 9 is a cross-sectional, cutaway view of the turbine wheel of FIG. 8.

FIG. 8 shows the example turbine wheel 460 in a plan view from the nose end, a side view and a plan view from the backdisk end. The plan view from the nose end includes a line A-A where a cross-sectional, cutaway view along the line A-A is shown in FIG. 9.

FIG. 8 shows a dimension labeled $D_{max}$, which is the maximum diameter of the turbine wheel 460 as defined by a circle illustrated with dashes spaced with two dots. The circle with diameter $D_{max}$ includes N radii, $r_{max}$, one for each blade 490-1 to 490-N (noting that $r_{max}$ is a different parameter than Rmax). In the example of FIG. 8, N is equal to eleven. FIG. 8 also shows a dimension labeled $\Delta zbp_{min}$, which is an axial dimension at a radial position. For example, FIG. 4 shows a diameter that is a minimum diameter of an outer perimeter of the backdisk $Dbp_{min}$, which is also shown in FIG. 8, as corresponding to an inscribed circle illustrated by a dotted circle in the plan view from the backdisk end of the turbine wheel 460. At a particular diameter or radius, the backdisk 480 can include the axial dimension $\Delta zbp_{min}$, which may be at the diameter $Dbp_{min}$ or slightly inset therefrom. The dimension $\Delta zbp_{min}$ may be a minimum thickness of the backdisk 480.

FIG. 8 also shows the shaft joint portion 450 with the shoulder 452 and surfaces 453, 455 and 457. As shown, the surface 457 can be a surface that is a mating surface for joining a shaft to the shaft joint portion 450 of the turbine wheel 460. As mentioned, the outer diameter of the shaft joint portion 450 at the surface 455 may be approximately the same as that of a seal portion (see, e.g., the seal portion 440).

As mentioned, the minimum diameter or minimum radius of an outer perimeter of a backdisk can correspond to a scalloped portion of a turbine wheel. A turbine wheel can be asymmetric where an uneven number of blades are included such that a minimum radius may not correspond to a minimum diameter as represented by a line. For example, consider a plurality of scalloped portions, each with a defining radius, where a cutting plane through a turbine wheel does not intersect two scalloped portions in the same manner such that a minimum diameter may be greater than twice the defining radius. As an example, where a turbine wheel includes scalloped portions, each of the scalloped portions may include a common radius. As an example, a scalloped portion can include a region that is at a radius as illustrated by the dotted circle in the plan view from the backdisk end of the turbine wheel of FIG. 8. As an example, a scalloped portion can be defined by a radius that can span an azimuthal angle about a rotational axis of a turbine wheel. For example, consider a turbine wheel with a number of blades N where a scalloped portion can be defined by an angle that is less than 360 degrees divided by N. In the example of FIG. 8, N equals eleven and the angle is approximately 16 degrees for each of the scalloped portions as may be defined in part by portions of the inscribed circle. In FIG. 8, an angle $\phi_s$ is shown, which can be a scalloped portion azimuthal span angle.

As an example, a turbine wheel backdisk may be defined by portions that extend radially beyond a radius or diameter. For example, in FIG. 8, the backdisk of the turbine wheel 460 may be defined in part by the inscribed circle and portions that extend radially outward beyond the radius of the inscribed circle. As shown in FIG. 8, the portions that extend radially outward are, in number, equal to the number of blades and each of those portions corresponds to one of the blades. Such an approach can be for blade support, for example, at or near a leading edge of a blade where it meets the backdisk. As shown in FIG. 8, a dot-dash circle inscribes the eleven extensions and defines a maximum radius or maximum diameter of the backdisk $Dbp_{max}$.

As illustrated in FIG. 8, a difference exists between the circle of $Dbp_{min}$ and the circle of $Dbp_{max}$ where such a difference may be represented as an annular region that includes a number of extensions that is equal to the number of blades.

As to each 3D bolster region 485 shown in the example turbine wheel 460 of FIG. 8, they are predominantly inboard of the inscribed dotted circle ($Dbp_{min}$) As an example, a centroid of a 3D bolster region of a backdisk of a turbine wheel can be radially inboard a circle that inscribes scalloped regions of the backdisk. For example, a 3D bolster region, where formed of a material (e.g., that of the turbine wheel itself), can be defined via a geometric centroid that is the center of mass of the 3D bolster region. As an example, a backdisk of a turbine wheel can include 3D bolster regions where each of the 3D bolster regions can be defined by a geometric centroid where the geometric centroid can be at an azimuthal angle about a rotational axis of the turbine wheel and at a radius as measured from the rotational axis of the turbine wheel. As an example, a backdisk can be defined in part by a geometric centroid-to-geometric centroid angle of a plurality of 3D bolster regions. In such an example, the angle may be approximately 360 degrees divided by a number of blades. For example, for eleven blades, the angle may be approximately 32.7 degrees. Where a backdisk includes scalloped regions and extension portions, a scalloped region may span an angle approximately one-half of the angle 360 degrees divided by a number of blades and an extension portion may span an angle approximately one-half of the angle 360 degrees divided by a number of blades. For example, in FIG. 8, the example backdisk 480 of the turbine wheel 460 has eleven blades where each scalloped portion spans approximately 16.3 degrees and where each extension spans approximately 16.3 degrees where blade leading edges are spaced approximately 32.7 degrees where they meet the backdisk and where 3D bolster regions are spaced approximately 32.7 degrees (e.g., from centroid to centroid). As shown, transition regions exist between each of the extensions and corresponding scalloped portions.

While, in various examples, number of blades is utilized as a reference, a number of 3D bolster regions may be less than, equal to or more than a number of blades. For example, consider a number of 3D bolster regions that may be positioned at fewer than all identified maximum stress points or at all identified maximum stress points and at one or more other identified stress points (e.g., next highest stress points, etc.).

As shown in the example of FIG. 9, the turbine wheel 460 includes various blade features such as a leading edge 491 (or inducer edge), a trailing edge 499 (or an exducer edge), a backdisk point 492 of the leading edge 491, a tip point 493 of the leading edge 491, a hub point 494 of the trailing edge 499 and a tip point 495 of the trailing edge 499. As shown, the turbine wheel 460 has a maximum blade outer diameter at the tip point 493 of the leading edge 491 (e.g., inducer edge); another blade outer diameter at the tip point 495 of the trailing edge 499 (e.g., exducer edge); and a minimum blade diameter at the hub point 494 at the trailing edge 499 (e.g., exducer edge).

FIG. 9 also shows various features of the shaft joint portion 450, which include the surfaces 451, 453, 455 and 457, where the shoulder 455 is defined as a step down from the surface 451 to the surface 455 (e.g., from a radius of the surface 451 to a smaller radius of the surface 455).

As shown in the example of FIG. 9, a dashed line represents a hub profile of the blade 490-5 while a solid line 498 represents at least a portion of a shroud profile of the blade 490-5.

As shown in the example of FIG. 9, crosshairs mark a radial position and an axial position of a point associated with a 3D bolster region 485 as defining in part an annular recess 483. A distance between the lowermost point on the outer perimeter of the backdisk 480 is shown with respect to the hub profile 496, indicated as Δzsm.

As shown in the example of FIG. 9, the backdisk 480 includes a profile that defines and forms the annular recess 483 where the 3D bolster region 485 defines a portion of a surface of the annular recess 483. Again, the crosshairs are marked at a position along the hub profile 496 of the blade 490-5.

Figure 10:
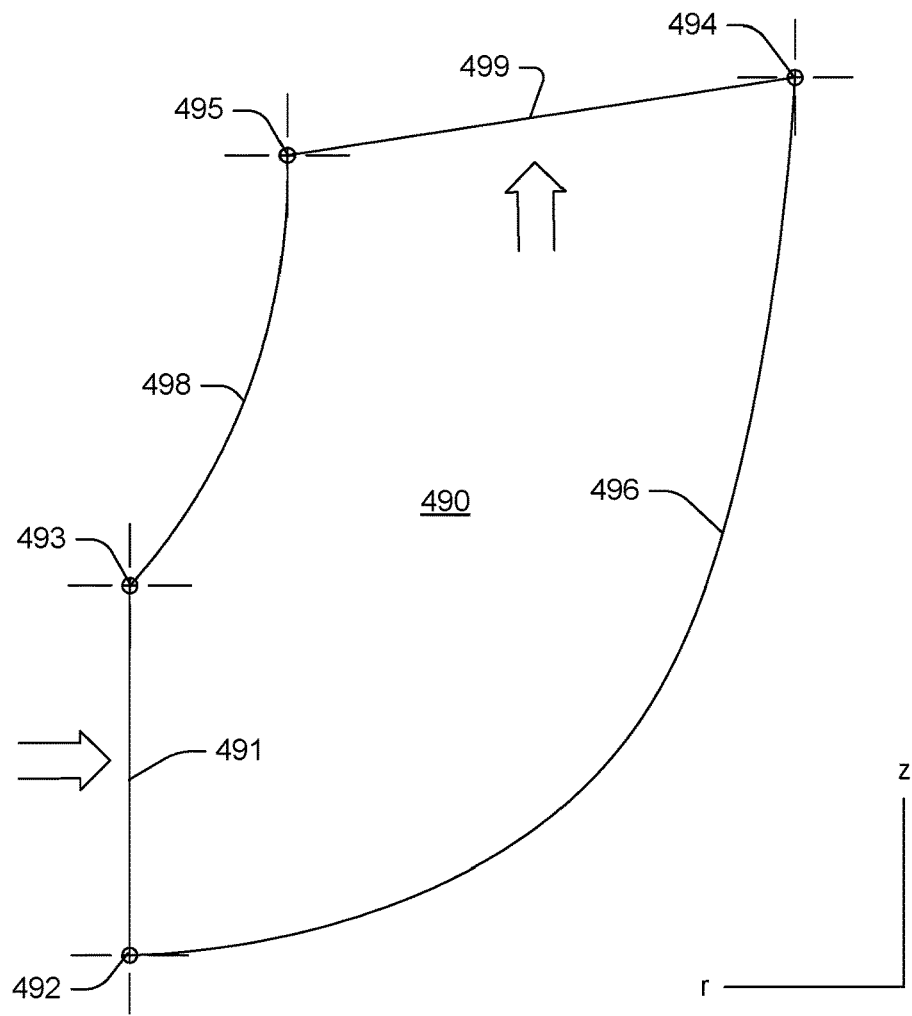
FIG. 10 is a projected view of an example of a blade of a turbine wheel with a radial inflow leading edge and a projected view of an example of a blade of a turbine wheel with a mixed-flow inflow leading edge.
Figure 10:
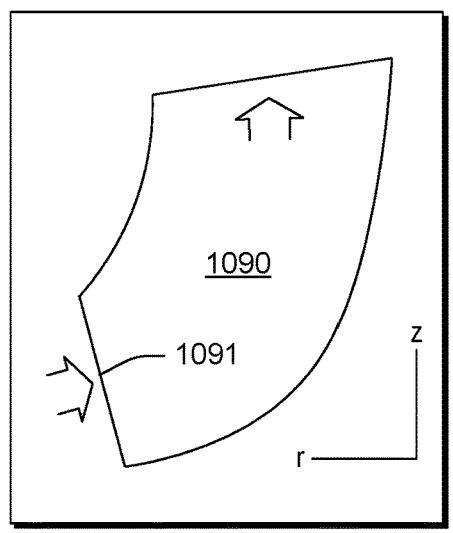

FIG. 10 shows a plan view of an example of the blade 490, along with various points and profiles described with respect to FIG. 9. FIG. 10 also shows arrows that indicate intended direction of flow of exhaust, from the leading edge 491 to the trailing edge 499 where two adjacent blades define a flow channel for exhaust (e.g., an exhaust flow channel). As mentioned, one side of a blade can be defined as a pressure side while an opposing side of the blade can be defined as a suction side. The plan view of FIG. 10 is a projected view such that the concave and convex shapes of the blade 490 are not seen. In FIG. 10, the blade 490 can be defined with respect to radial and axial coordinates. As an example, a polar angle plot may be utilized to provide for additional information that defines the blade 490. For example, consider a plot of wrap angle along a camber line. As an example, the blade 490 may be defined using one or more equations, parameters, etc., of an airfoil or an impeller.

As an example, a turbine wheel can be a radial inflow turbine wheel or can be a mixed-flow turbine wheel where an angle can define at least a portion of a leading edge such that incoming exhaust has both a radial component and an axial component. FIG. 10 shows an example of a mixed-flow turbine wheel blade 1090 where a leading edge 1091 is at an angle other than 90 degrees with respect to the r-axis and is at an angle other than 0 degrees with respect to the z-axis. As an example, a turbine wheel blade may be radially stacked or not radially stacked.

Figure 11:
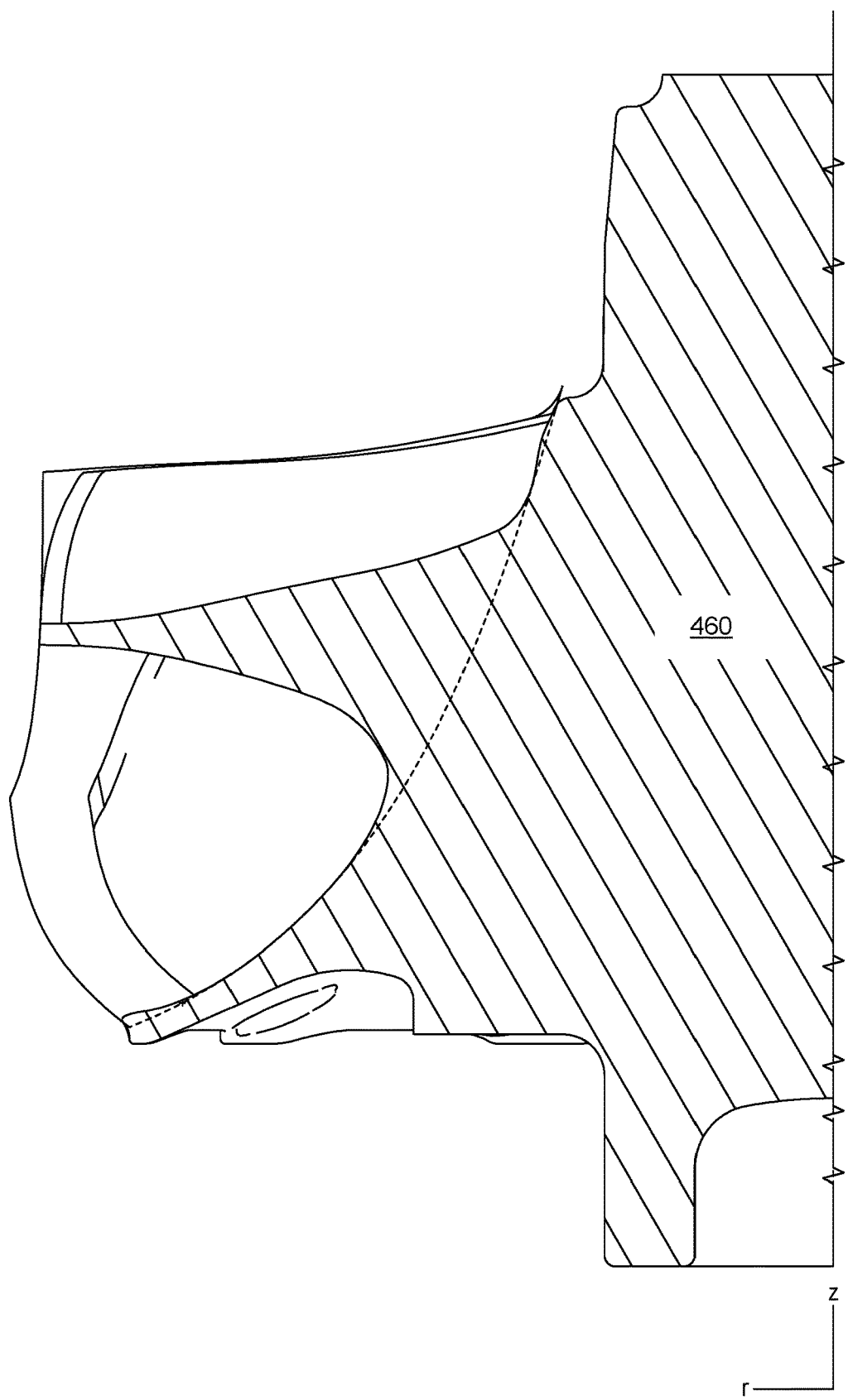
FIG. 11 is an enlarged, cross-sectional, cutaway view of a portion of the turbine wheel of FIG. 9.

FIG. 11 shows an enlarged view of the cross-sectional, cutaway view of the turbine wheel 460 of FIG. 9. Various features therein can be described with respect to a cylindrical coordinate system that can include r, z and Θ coordinates.

Figure 12:
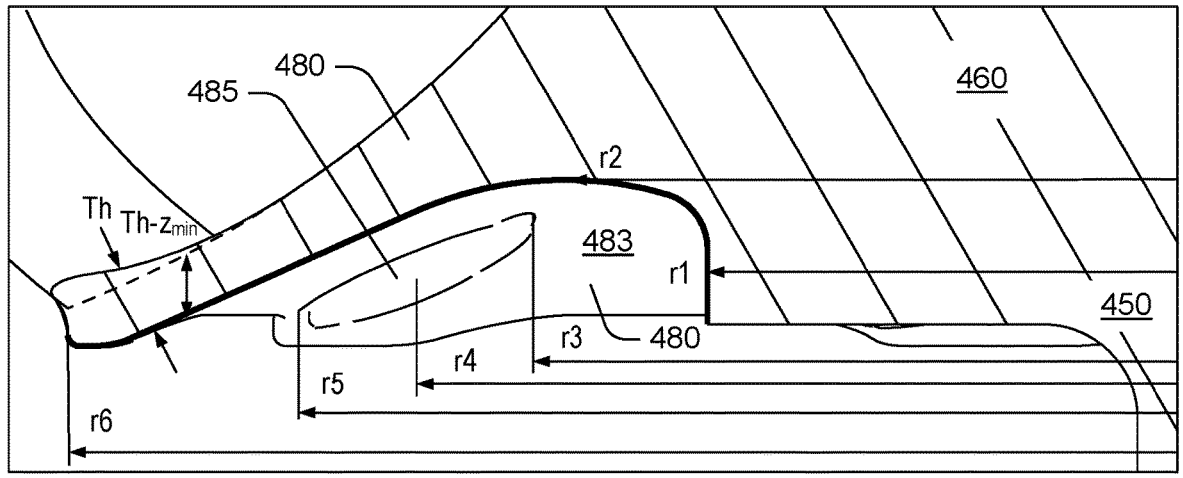
FIG. 12 is an enlarged, cross-sectional, cutaway view of a portion of the turbine wheel of FIG. 9 with radial coordinates and an enlarged, cross-sectional, cutaway view of a portion of the turbine wheel of FIG. 9 with axial coordinates.
Figure 12:
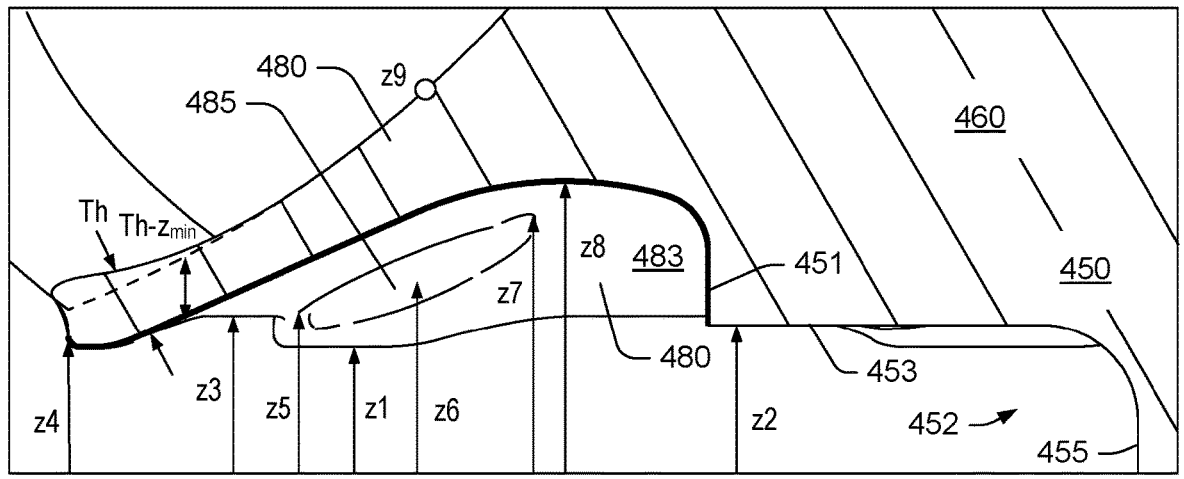

FIG. 12 shows enlarged views of the cross-sectional, cutaway view of the turbine wheel 460 of FIG. 9. Various features therein can be described with respect to a cylindrical coordinate system that can include r, z and Θ coordinates. In FIG. 12, a first view includes various features that can be described with respect to radial coordinates and a second view includes various features that can be described with respect to axial coordinates.

The views of FIG. 12 show the annular recess 483 and the 3D bolster region 485 of the backdisk 480, where the backdisk 480 includes the shaft joint portion 450. The backdisk 480 can be defined at least in part by a radius r1 and a radius r6 as measured from a z-axis of rotation of the turbine wheel 460. As shown, the profile of the annular recess 483, indicated with a thick line, extends radially from r1 to r6 where the 3D bolster region 485 spans from r3 to r5 and includes r4, which can be a centroid (e.g., geometric centroid) and/or a point that corresponds to a maximum stress point of the turbine wheel 460 without the 3D bolster region 485. As may be appreciated, in the cutaway view, the 3D bolster region 485 is disposed aft of the cutting plane, which is indicated by the hash lines. The profile of the annular recess 483 can differ, for example, it can differ at an azimuthal angle that coincides with a portion of the 3D bolster region 485. Further, the profile of the annular recess 483 can differ, for example, where it corresponds to a scalloped region of the backdisk 480. As shown in the example of FIG. 12, the radius r1 is a radius of the surface 451 of the shaft joint portion 450 where an annular corner may be formed between the surfaces 451 and 453. As mentioned, the shaft joint portion 450 of the backdisk 480 can provide balance stock in that material may be removed from the shaft joint portion 450 to balance a turbine wheel or an assembly that includes a turbine wheel.

As shown in FIG. 12, the z coordinates include z1 as a lowermost z coordinate of the outer perimeter of the backdisk 480 that corresponds to a blade joining region, z2 as a z coordinate of a region of the turbine wheel 460 that is radially inward from the annular recess 483 (e.g., corresponding to the surface 453), z3 as a z coordinate of a scalloped region of the backdisk 480 (e.g., a channel region), z4 as a z coordinate of a point of the backdisk 480 that curves upwardly at the outer perimeter of a blade joining region 485, z5 as a z coordinate of a lowermost point of a perimeter of the 3D bolster region 485, z6 as a z coordinate of a centroid of the 3D bolster region 485, z7 as a z coordinate of an uppermost point of a perimeter of the 3D bolster region 485, z8 as a z coordinate of an uppermost point of the annular recess 483, and z9 as a point along the hub profile 496 that is above the centroid of the 3D bolster region 485. As indicated, the backdisk 480 can be defined by a thickness labelled Th, which can vary with respect to radius and, for example, azimuth. In the example shown in FIG. 12, the thickness Th can vary differently for a cross-section through the 3D bolster region 485.

In FIG. 12, a thickness labeled Th-$z_{min}$ is shown as being at a radius and representing a minimum thickness as measured in an axial direction with respect to the z-axis as the rotational axis of the turbine wheel 460. As an example, for a turbine wheel with a blade outer diameter of approximately 39 mm (e.g., as an inscribed circle), Th-$z_{min}$ may be at a radius of approximately 15.5 mm (e.g., a diameter of approximately 31 mm) and be less than approximately 1 mm (e.g., consider 0.75 mm).

As an example, a backdisk of a turbine wheel that includes 3D bolster regions can be thinner at various portions than a backdisk without such 3D bolster regions. For example, an annular recessed region of a backdisk may be defined by a lower surface (backdisk side) that is closer to an upper surface (blade side or nose side) where thickness of the backdisk is defined by axial dimensions therebetween (see, e.g., FIG. 18).

Figure 13:
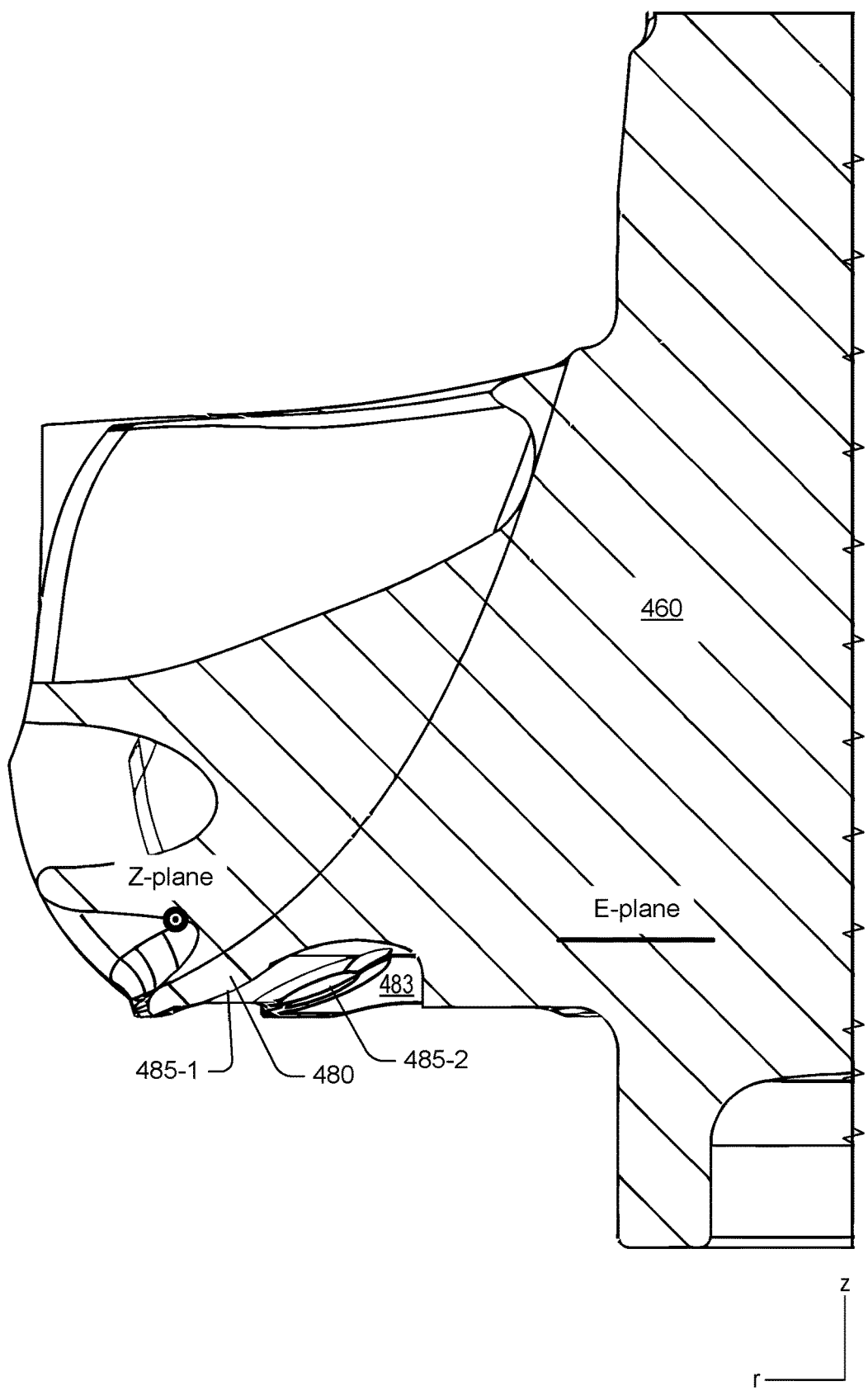
FIG. 13 is a cross-sectional, cutaway view of the turbine wheel of FIG. 8.

FIG. 13 shows an enlarged view of the cross-sectional, cutaway view of the turbine wheel 460 of FIG. 9, which is a different cross-sectional, cutaway view than the enlarged view of FIG. 11. Specifically, the cross-sectional view of FIG. 13 is through one of the 3D bolster regions 485-1, which can be seen via an outward bulge in the backdisk 480, where the bulge is into the recess 483. FIG. 13 also shows another, adjacent 3D bolster region 485-2. Thus, the backdisk 480 includes a plurality of 3D bolster regions. In FIG. 13, various features can be described with respect to a cylindrical coordinate system that can include r, z and θ coordinates.

FIG. 13 also shows an E-plane and a Z-plane. The E-plane is indicated by a thick line and can serve as baseline for dimensioning and measuring during manufacturing. In some instances, it can be a place that can define locations for material to cut-out during balancing. The Z-plane is a baseline for blade aerodynamic design. It can be a plane perpendicular to an axis going through a theoretical intersection of a wheel hub and a blade leading edge contour indicated by a dot within a circle.

Figure 14:
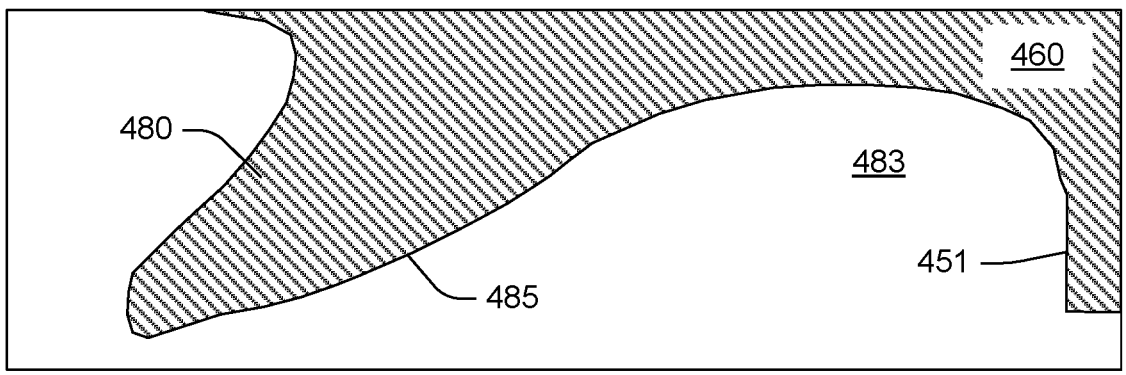
FIG. 14 is a series of enlarged, cross-sectional views of a portion of the turbine wheel of FIG. 13.
Figure 14:
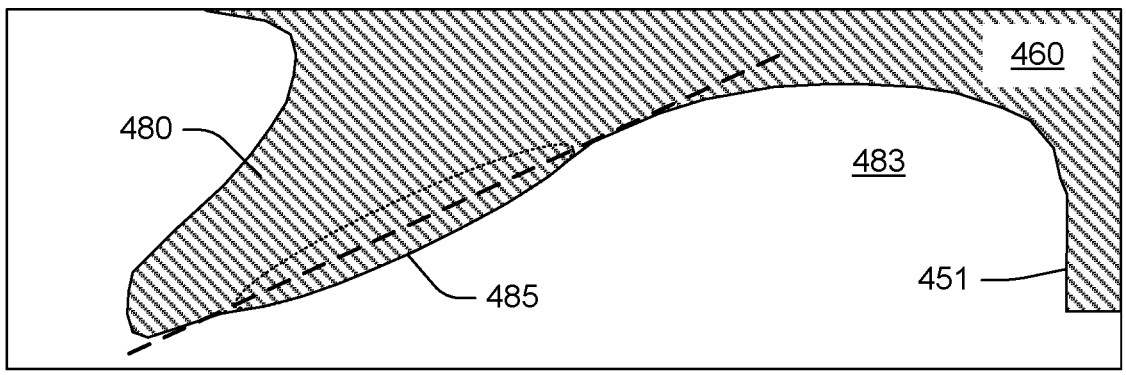
Figure 14:
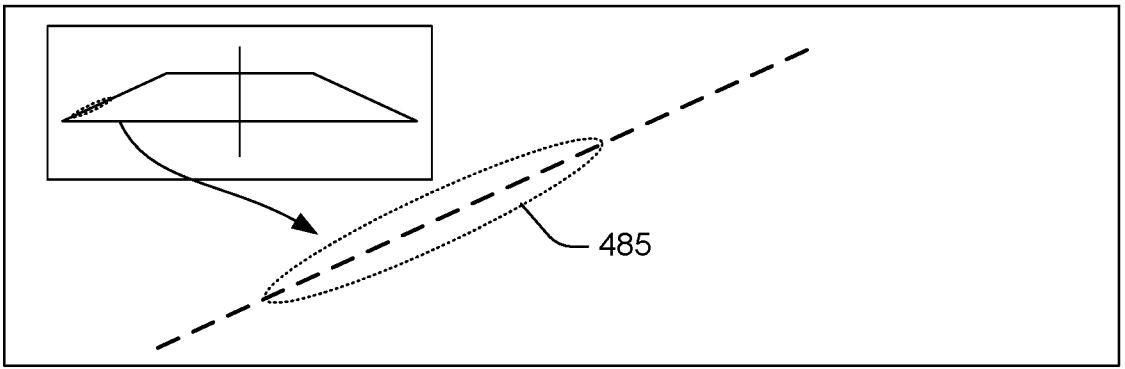

FIG. 14 shows an enlarged view of the cross-sectional view of FIG. 13, which is through a 3D bolster region 485. As shown, the recess 483 is defined in part by the 3D bolster region 485 and is defined in part by the surface 451, which may be a relatively cylindrical surface (e.g., with a relatively constant radius over an axial span). As an example, the shape of the surface 451 may differ from being relatively cylindrical, for example, consider a surface where radius increases with respect to axial dimension such that the surface is relatively conical. As an example, the surface 451 may be available as balance stock that can be cut to remove material from the turbine wheel 460 for purposes of balancing the turbine wheel 460 and/or an assembly that includes the turbine wheel 460.

In the example of FIG. 14, the 3D bolster region 485 can be defined, for example, via various geometric shapes such as a line or plane and an ellipse or an ellipsoid. As an example, an ellipsoid can be intersected by a plane where the plane can be a tangent plane to a backdisk. In such an example, the plane may be a portion of a cone, for example, consider a cone that can approximate a lower surface of the backdisk 480 without the 3D bolster regions 485. In such an example, a 3D bolster region can be approximated as a portion of an ellipsoid that is a portion of a full ellipsoid that is cut by the portion of the cone. FIG. 14 shows an inset view of a portion of a cone that cuts an ellipsoid.

An ellipsoid is a quadric surface that may be defined as the zero set of a polynomial of degree two in three variables. Among quadric surfaces, an ellipsoid is characterized by either of the two following properties. An ellipsoid can be bounded, which means that it may be enclosed in a sufficiently large sphere.

An ellipsoid includes three pairwise perpendicular axes of symmetry which intersect at a center of symmetry, called the center of the ellipsoid. Line segments that are delimited on the axes of symmetry by the ellipsoid are called the principal axes, or simply axes of the ellipsoid. If the three axes have different lengths, the ellipsoid is said to be tri-axial or rarely scalene, and the axes are uniquely defined.

If two of the axes have the same length, then the ellipsoid is an ellipsoid of revolution, also called a spheroid. If the third axis is shorter, the ellipsoid is an oblate spheroid; if it is longer, it is a prolate spheroid. If the three axes have the same length, the ellipsoid is a sphere. As an example, a 3D bolster region may be an ellipsoidal cap or may be approximated by an ellipsoidal cap (e.g., an ellipsoid cut by a surface, which can be a planar surface, a conical surface (see, e.g., FIG. 14), etc.

An ellipsoid may be defined by the following equation in Cartesian coordinates with axes a, b and c: $x^2/a^2+y^2/b^2+z^2/c^2=1$. As an example, a three-dimensional bolster region may be defined by such an equation or approximated by such an equation. For example, while the equation may define a closed surface that is of a volume that is larger than a volume of a three-dimensional bolster region, a portion of that closed surface may define or approximate a three-dimensional bolster region, for example, prior to material being removed from the three-dimensional bolster region for purposes of balancing a turbine wheel for a turbocharger.

Figure 15:
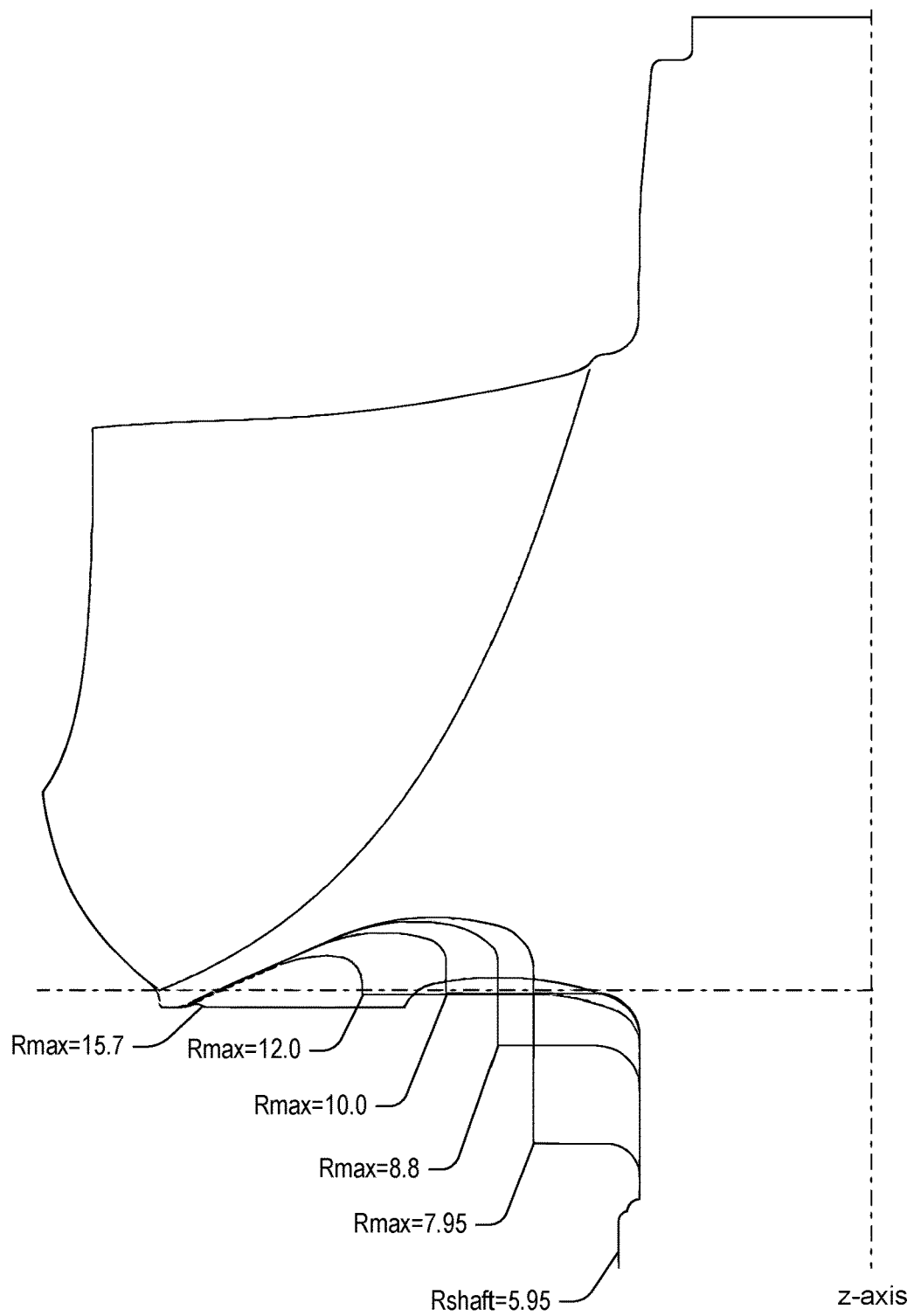
FIG. 15 is a series of profiles of various examples of turbine wheels.

FIG. 15 shows a series of profile of examples of turbine wheels where various radii are shown, including Rmax values of 15.7, 12.0, 10, 8.8 and 7.95 and a Rshaft value of 5.95. As to Rmax, it can be the parameter Rsjp as shown in FIG. 4 (see also the surface 451 in FIG. 9). Rmax can represent the maximum radius of available balance stock provided by the shaft joint portion 450 of the backdisk 480 of the turbine wheel 460; whereas, another parameter Rmin can represent the minimum radius of available balance stock provided by the shaft joint portion 450 of the backdisk 480 of the turbine wheel 460. For example, a method can include balancing a turbine wheel and/or an assembly that includes a turbine wheel by removing material from balance stock at a radius or radii that within Rmax and Rmin.

The Rmax parameter in FIG. 15 can also be compared with, for example, the r1 parameter of FIG. 12, which is a radial dimension of the backdisk 480 from the rotational axis to the recess 483 (see also the surface 451 of FIG. 12). As to the Rmax value of 15.7, the recess, if any, is minimal (e.g., the surface 451 of the shaft joint portion 450 may be non-existent as the surface 453 may extend to the outer perimeter of the backdisk); whereas, for the Rmax value of 7.95, the recess is the largest of the series of profiles shown (e.g., the smallest value of Rsjp).

As explained, a backdisk can provide material that is balance stock that contributes to the BC of a turbine wheel. Where a backdisk can provide more material at a lesser radius, it may, overall, provide for lesser polar inertia while still providing adequate BC. Further, depending on thickness of a backdisk at larger radii (e.g., along a portion defining a recess), slimness of the backdisk may or may not warrant inclusion of bolster regions. As an example, a turbine wheel can include a backdisk shape that provides for adequate BC, improved polar inertia and adequate integrity. Such a turbine wheel may include bolster regions, which may allow for sliming of a portion of a backdisk and improved polar inertia.

In the examples of FIG. 15, a turbine wheel can include scallops of diameter approximately 31.4 mm, a blade hub outer diameter of approximately 33.54 mm, a blade tip max diameter of approximately 39.05 mm, a Rshaft radius of approximately 5.95 mm and a Rbackdisk radius of approximately 15.70 mm. For example, the Rmax=15.7 can correspond to such a turbine wheel where Rmax is approximately Rbackdisk (e.g., no or minimal recess). As to the other examples, the Rmax values can be in millimeters (e.g., 12 mm, 10 mm, 8.8 mm, 7.9 mm, etc.).

Figure 16:
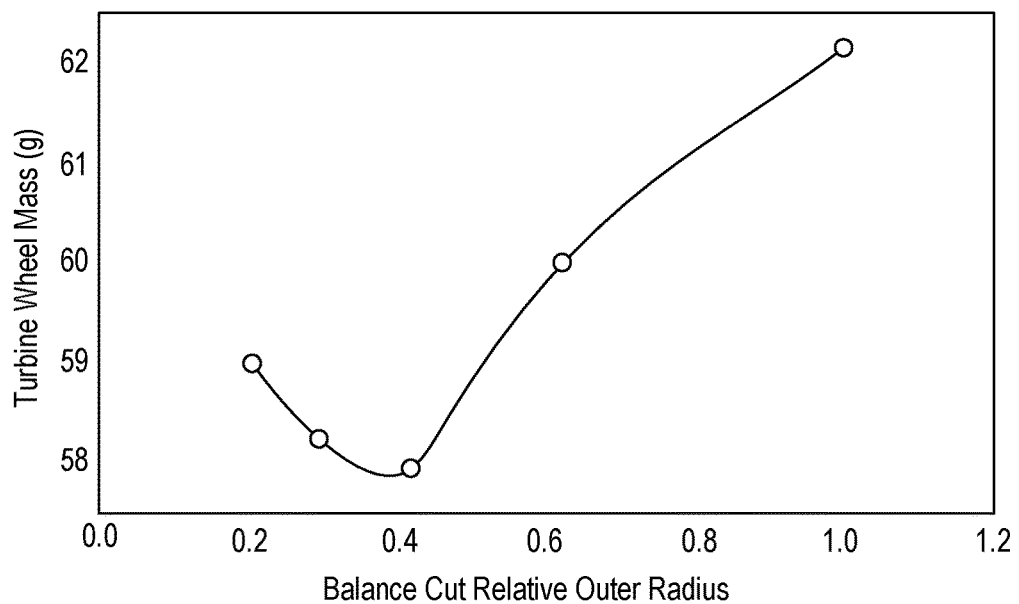
FIG. 16 is a series of example plots for turbine wheel mass and inertia.
Figure 16:
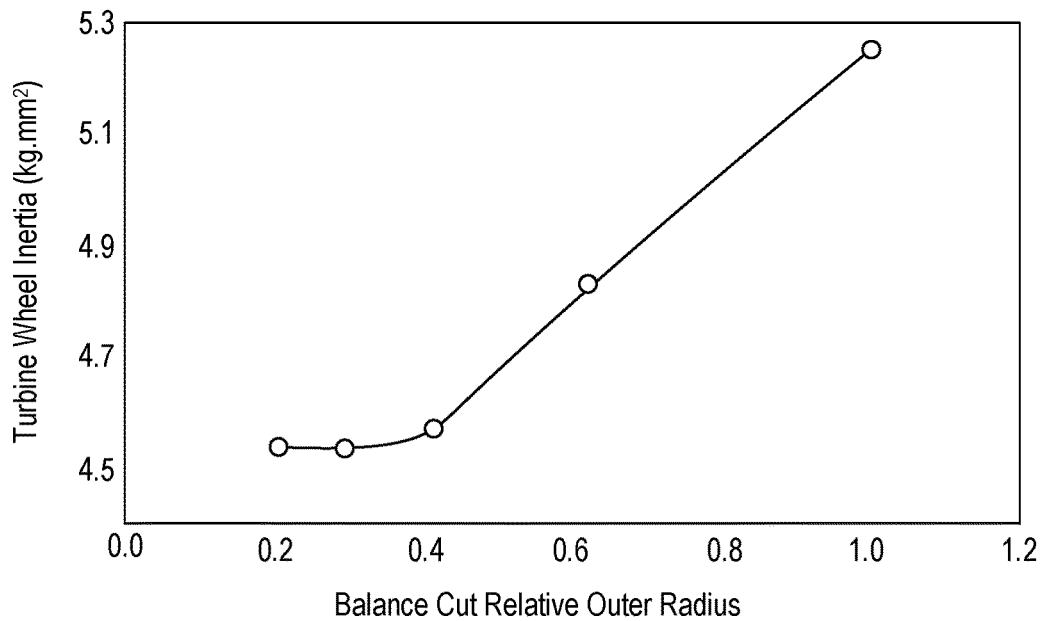

FIG. 16 shows example plots 1610 and 1630 where turbine wheel mass and inertia are plotted versus relative radius. Relative radius can be defined as r=(Rmax−Rshaft)/(Rbackdisk−Rshaft) where Rbackdisk can be, for example, the minimum outer perimeter radius (e.g., $0.5*Dbp_{min}$ as in FIGS. 4 and 8) where the backdisk includes scalloped regions. As shown, a Rmax reduction from 15.7 mm to 10 mm (r=0.4) reduces $I_0$ while also reducing mass (see, e.g., FIG. 15 and Rmax=10.0); whereas, a further reduction in relative radius does not provide for an additional $I_0$ benefit and starts to increase turbine wheel mass. Such plots may be utilized to design a turbine wheel with a desirable polar inertia and a desirable mass.

Figure 17:
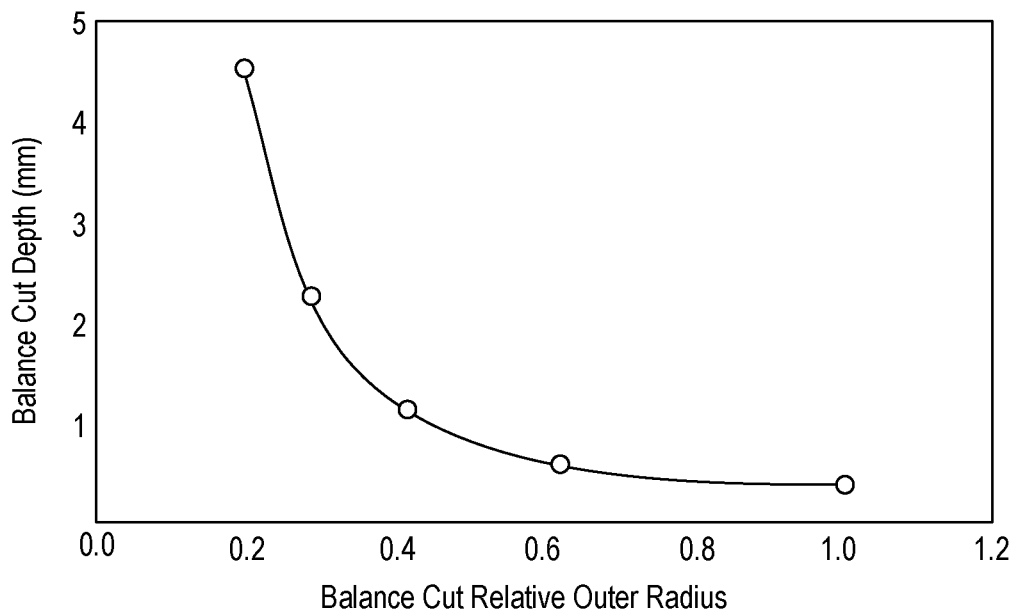
FIG. 17 is a series of example plots for turbine wheel balance cut depth and inertia.
Figure 17:
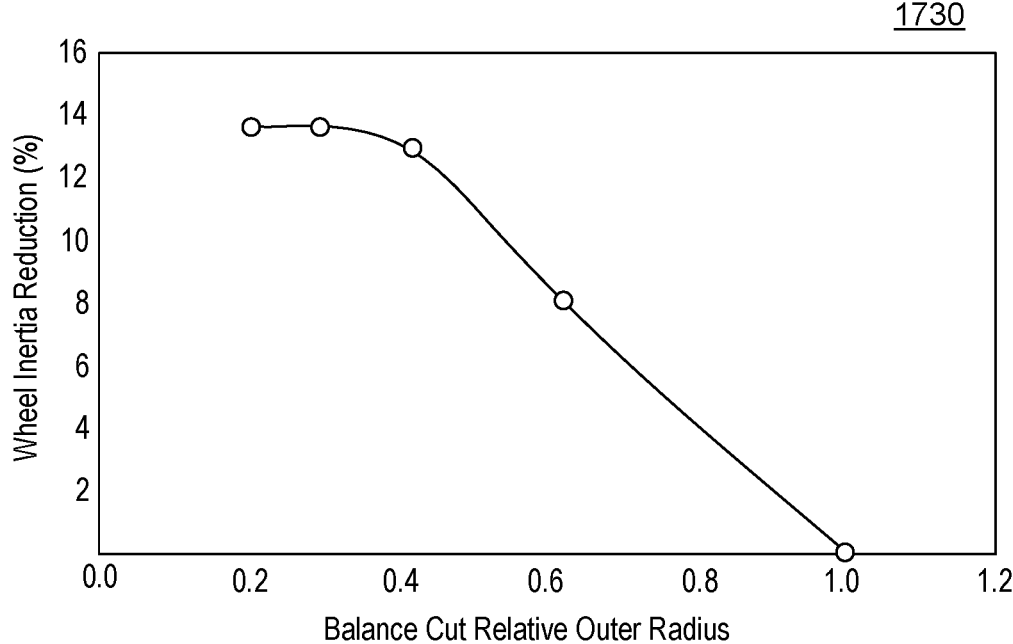

FIG. 17 shows example plots 1710 and 1730 where turbine wheel balance cut depth and inertia are plotted versus relative radius (e.g., versus maximum $I_0$ value at maximum radius Rmax). As shown in the example plots 1710 and 1730, a relative radius reduction below approximately 0.4 (e.g., r<0.4) provides a balance cut depth increase, which is a reason why further radius reduction becomes ineffective from an $I_0$ point of view.

As explained, FIG. 15 shows examples of five turbine wheel backdisk variants of different BC maximum radius (Rmax) as to a portion of a backdisk (e.g., shaft joint portion) that can be suitable for material removal (e.g., to provide adequate balancing capacity). The examples were designed and optimized using centrifugal-thermal-stress finite element analysis (FEA) to provide comparable BC and durability. The examples utilized INCONEL 713LC material as a material of construction. As explained, variants with Rmax equal to 10 mm (e.g., outer radius of the balancing stock) and smaller can be equipped with 3D disk reinforcement, which can be present as bolster regions. As to larger Rmax values of the examples, 3D reinforcement was optional as the stress modeling results (FEA results) indicated that stress would be within acceptable limits.

In the examples of FIG. 15, balancing simulation (e.g., a 83 mm grinding wheel, 150 degree sector) was performed to avoid grinding wheel collision with the turbine wheel and to provide comparable BC for all of variants. As to the variant with Rmax equal to 15.7 mm, a U shaped balance cut was utilized because it reached the turbine wheel's scallop diameter; whereas, for the other variants, an L shaped balance cut was utilized. The FEA results include a 2D disk variant for Rmax equal to 10 mm without 3D reinforcement to demonstrate principle and benefit of using bolster regions for reinforcement. As mentioned, a 3D shape element (e.g., a bolster or a stiffener) can be positioned in angular and radial position intentionally at an otherwise high stress spot to reinforce a turbine wheel backdisk.

As an example, a turbine wheel can include a backdisk that is defined by a relative radius where the relative radius, r, can be defined as r=(Rmax−Rshaft)/(Rbackdisk−Rshaft). The parameter Rmax is shown in FIG. 15 as being a radius as measured from a rotational axis of a turbine wheel. FIG. 4 shows the shaft joint portion 450, which can be defined in part by a radius such as Rmax (see, e.g., Rsjp). For example, consider the variant with Rmax equal to 7.95 in FIG. 15. FIG. 12 also shows a radius r1, which can correspond to Rmax (see, e.g., the variant with Rmax equal to 10.0 and the variant with Rmax equal to 12.0).

As explained, due to balancing being achievable by removing a smaller amount of mass at a larger diameter, balancing stock tends to be located at a radius that is close to the outer diameter of a backdisk of a turbine wheel. For example, consider a 2D profile backdisk thickness that is sufficiently thick near the outer perimeter such that grinding can be utilized to grind away a portion of the turbine wheel's material such that the thickness remains sufficient to meet criteria. Such an approach does not adequately consider polar inertia of a turbine wheel. As explained herein, balancing stock can be located at a lesser diameter (e.g., a lesser radius) and provide for a lesser polar inertia. Such an approach can account for inertia being proportional to the square of the radius ($I_0$=mass*radius$^2$).

Various examples of turbine wheels described herein can involve an $I_0$-BC trade-off, which can be characterized by one or more plots (e.g., curves, functions, etc.). As an example, consider an equation in the form of $I_0$=BC*radius or $I_0$/BC=radius. As explained, inertia of a given BC is smaller if located at a smaller radius (e.g., BC=mass*radius). As an example, for a particular style of turbine wheel, a range of radii can be determined using various equations (e.g., optionally including FEA) where inertia can be improved, optionally with or without inclusion of bolster regions. As mentioned, BC accommodated closer to a turbine wheel's rotational axis can allow for a relatively slim backdisk at larger radii, which can itself reduce turbine wheel inertia. However, as mentioned, a gradual reduction of the backdisk thickness towards a manufacturing limit can lead to excessive thermal and centrifugal (e.g., due to disk bending) stresses at its outer diameter such that slimming is to be limited for the sake of turbine wheel durability. Where such concerns exist, as explained, 3D shape elements, referred to as bolster regions, can be included to reinforce the backdisk at the high stress regions. Such an approach may allow for further thickness reduction and then for maximal utilization of the BC on small radius concept for $I_0$ reduction. A so-called "smart" approach to 3D disk reinforcement located precisely at high stress region can involve a stiffness increase at places where it is needed to support turbine wheel durability and, optionally, without an increase in turbine wheel mass and inertia (e.g., presence of bolster regions offset by reduction in overall mass). Various examples of turbine wheels described herein improve performance when compared to axi-symmetrical 2D reinforced turbine wheels.

Figure 18:
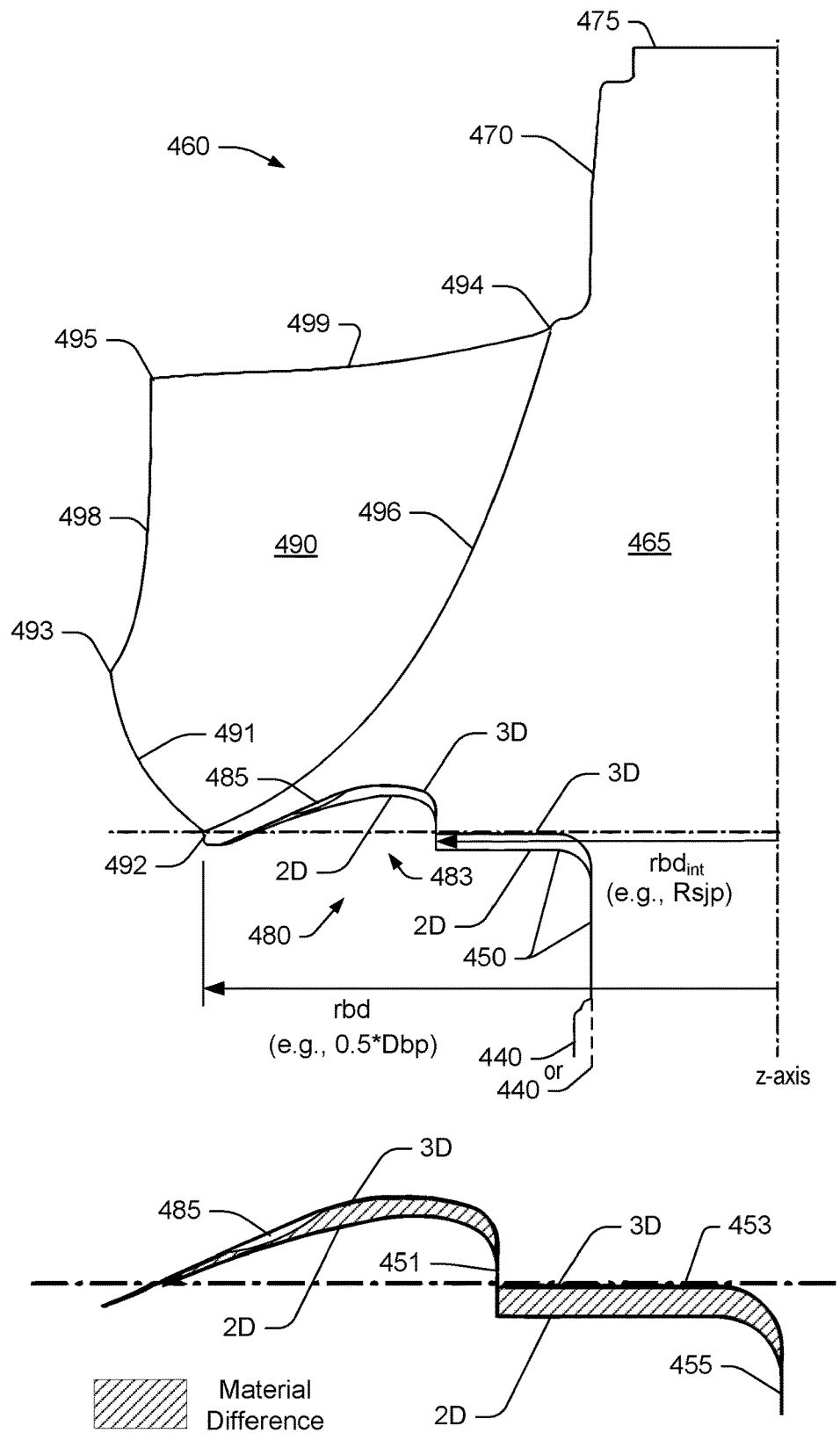
FIG. 18 is a schematic view of a 2D backdisk profile and an example of a 3D backdisk profile.

FIG. 18 shows examples of a 3D backdisk profile versus a 2D backdisk profile where the 3D backdisk profile allows for a reduction in mass and polar inertia. As an example, the 3D backdisk profile can alter stress in a beneficial manner. As explained, a high stress can be reduced where a 3D bolster region is positioned at the point of high stress (e.g., a high stress point as may be determined via FEA). As an example, a 3D backdisk profile through introduction of 3D bolster regions can increase a turbine wheel's BC and durability.

As shown in the example of FIG. 18, an exhaust turbocharger turbine wheel 460 can include a hub 465 that includes a nose 475, a backdisk 480, a shaft joint portion 450 (e.g., as part of the backdisk 480) and a rotational axis (z-axis); blades 490 that extend from the hub 465 to define exhaust flow channels where each of the blades 490 includes a leading edge 491, a trailing edge 499, a hub profile 496, a shroud profile 498, a pressure side, and a suction side; where the backdisk 480 includes an outer perimeter radius (rbd) measured from the rotational axis of the hub 465, an intermediate radius ($rbd_{int}$) at an outer perimeter of the shaft joint portion 450 measured from the rotational axis of the hub 465, and an annular recess 483 disposed between the intermediate radius ($rbd_{int}$) and the outer perimeter radius (rbd) and defined in part by three-dimensional bolster regions 485, where each of the three-dimensional bolster regions 485 includes a footprint and a height measured at least in part in a direction of the rotational axis of the hub 465. As shown, the turbine wheel 460 can be part of a SWA where a shaft may be joined thereto (see, e.g., the seal portion 440). As explained with respect to various examples, the intermediate radius ($rbd_{int}$) can be a radius that is intermediate an outer perimeter radius (e.g., 0.5*$Dbp_{max}$ or 0.5*$Dbp_{min}$ depending on presence of absence of scallops) and the axis of rotation of a turbine wheel (e.g., z-axis). The intermediate radius ($rbd_{int}$) may be, for example, represented by Rmax as in FIG. 15, Rsjp as in FIG. 4 or r1 as in FIG. 12 of one-half a diameter of the surface 451. While the surface 451 is illustrated as being relatively cylindrical with a relatively constant radius, it may be of a different shape where radius may vary (e.g., sloping radially outwardly from where it joins the surface 453). As an example, a turbine wheel that includes one or more balance cuts may include a shaft joint portion that is distorted by the one or more balance cuts such that a profile of the shaft joint portion may not be represented by a single 2D profile. For example, consider starting with a cylinder with an annular corner defined by the surfaces 451 and 453 where upon balancing one or more portions of the annular corner may be cut or the surface 451 may be cut and/or the surface 453 may be cut. Such one or more cuts may be at one or more corresponding specific azimuthal angles.

As mentioned, a 3D bolster region can be a 3D shape element where a plurality of such elements can be utilized to form a 3D backdisk profile that can reinforce a turbine wheel at high stress regions while providing for a reduction in inertia and a reduction in mass compared to a 2D backdisk profile. As indicated in Table 1, below, a 3.8 percent reduction in inertia was achieved along with 1.6 g reduction in mass.

TABLE 1

| Disk | Rmax mm | Rmin mm | Depth mm | r mm | E-Z mm | Mass g | $I_0$ kg·mm² | $I_0$ Diff % |
|---|---|---|---|---|---|---|---|---|
| 3D | 10.00 | 6.48 | 1.17 | 0.415 | 0.07 | 57.95 | 4.574 | 0.0 |
| 2D | 10.00 | 6.48 | 1.17 | 0.415 | 0.55 | 59.59 | 4.750 | 3.8 |

In Table 1, Rmax is outer (maximal) radius of the balancing stock, Rmin is minimal radius of the balancing stock, Depth is depth of the balancing cut, r is relative outer radius of the balancing stock (see equation 5 below), and E-Z is the turbine wheel E-plane to Z-plane distance. As shown, a 3D approach may reduce the distance between the E-plane and the Z-plane. Equation 5, below, defines the parameter r in Table 1.

$$r = (R\text{max} - R\text{shaft})/(R\text{backdisk} - R\text{shaft}) \quad (5)$$

As to Rshaft in equation 5, FIG. 4 shows the diameter Dsp, which can be the diameter that corresponds to Rshaft (see, e.g., the seal portion 440). The data in Table 1 pertain to a particular 3D backdisk where other 3D backdisks may differ in reduction of mass and/or inertia compared to corresponding 2D backdisk counterparts. As an example, a 3D backdisk can be utilized on a radial flow turbine wheel or on a mixed-flow turbine wheel (see, e.g., the blade 1090 of FIG. 10). One or more benefits may be greater on a mixed-flow turbine wheel compared to a radial flow turbine wheel due to a smaller Rmax value.

Various trials were performed for a number of backdisk variants of different BC, maximum radius, etc., using centrifugal-thermal-stress finite element analysis (FEA). The trials were performed using a material of construction having a composition and properties of INCONEL 713LC material. Variants with Rmax equal to 10 mm (outer radius of the balancing stock) and smaller were equipped with 3D backdisk reinforcement; noting that such 3D reinforcement was not necessarily needed for variants with larger Rmax values.

As to balancing simulation, trials included a 83 mm grinding wheel with a 150 degree sector where balancing was performed to avoid grinding wheel collision with a turbine wheel to provide comparable BC for all variants. The Rmax=15.7 backdisk variant utilized a U shape balance cut because it reached the turbine wheel backdisk scallop diameter, while the others utilized a L shape balance cut. The 2D backdisk variant for Rmax=10 mm, without 3D reinforcement, was designed to demonstrate principle and benefits. Table 2, below, shows various parameters and results.

TABLE 2

Example parameters and results.

| Disk | Rmax mm | Rmin mm | Depth mm | r mm | E-Z mm | Mass g | $I_0$ kg·mm² | $I_0$ Diff % |
|---|---|---|---|---|---|---|---|---|
| 3D | 7.95 | 6.30 | 4.60 | 0.205 | 3.6 | 59.01 | 4.539 | 13.6 |
| 3D | 8.80 | 6.30 | 2.30 | 0.292 | 1.30 | 58.26 | 4.537 | 13.6 |
| 3D | 10.00 | 6.48 | 1.17 | 0.415 | 0.07 | 57.95 | 4.574 | 12.9 |
| 3D | 12.00 | 6.80 | 0.60 | 0.621 | 0.10 | 60.02 | 4.831 | 8.0 |
| 3D | 15.70 | 11.00 | 0.40 | 1.00 | 0.40 | 62.18 | 5.253 | 0.0 |

As with Table 1, in Table 2, Rmax is outer (maximal) radius of the balancing stock, Rmin is minimal radius of the balancing stock, Depth is depth of the balancing cut, r is relative outer radius of the balancing stock (see equation 5), and E-Z is the turbine wheel E-plane to Z-plane distance.

As an example, an exhaust turbocharger turbine wheel can include a hub that includes a nose, a backdisk with a shaft joint portion, and a rotational axis; blades that extend from the hub to define exhaust flow channels where each of the blades includes a leading edge, a trailing edge, a hub profile, a shroud profile, a pressure side, and a suction side; where the backdisk includes an outer perimeter radius measured from the rotational axis of the hub, an intermediate radius at an outer perimeter of the shaft joint portion measured from the rotational axis of the hub, and an annular recess disposed between the intermediate radius and the outer perimeter radius and defined in part by three-dimensional bolster regions, where each of the three-dimensional bolster regions includes a footprint and a height measured at least in part in a direction of the rotational axis of the hub. As shown in FIG. 13, the 3D bolster regions 485-1 and 485-2 each include a height that can be measured at least in part in a direction of the rotational axis of the hub, which is shown as the z-axis. For example, a height can be measured in a direction from the nose to the base of the turbine wheel 460. In the example of FIG. 14, the height may be measured as an axis of an ellipse, which can be a minor axis (e.g., a semi-minor axis, another portion of a minor axis, etc.), which in the view of FIG. 14 can include a component that can be measured in a direction of the z-axis of FIG. 13.

As an example, an exhaust turbocharger turbine wheel can include a shaft joint portion that includes a shaft joint surface that includes a shaft joint radius, where a backdisk has a relative radius that is less than 0.5 and greater than 0.2 where the relative radius is defined as a difference between an intermediate radius at an outer perimeter of the shaft joint portion and the shaft joint radius divided by a difference between an outer perimeter radius of the backdisk and the shaft joint radius.

As an example, an exhaust turbocharger turbine wheel can include a balance cut in a shaft joint portion. As an example, a turbine wheel may include at least one three-dimensional bolster region that includes a balance cut. A balance cut may be made, for example, using a cutting tool, which may drill, cut, grind, ablate, etc., material from a backdisk, etc.

As an example, an exhaust turbocharger turbine wheel may be a radial inflow exhaust turbocharger turbine wheel or, for example, an exhaust turbocharger turbine wheel may be a mixed-flow inflow exhaust turbocharger turbine wheel.

As an example, an exhaust turbocharger turbine wheel can include a backdisk that includes scalloped regions. For example, consider a backdisk that includes blade joining regions where each of the scalloped regions is disposed between two of the blade joining regions.

As an example, an exhaust turbocharger turbine wheel can include a three-dimensional bolster region with a footprint where the footprint can be defined by a closed curve perimeter.

As an example, an exhaust turbocharger turbine wheel can include three-dimensional bolster regions where each of the three-dimensional bolster regions includes a droplet shape. Such a droplet shape may be defined, for example, using the Young-Laplace equation as used in surface tension analysis as to wetting of a liquid drop on a material surface (e.g., where wettability is exhibited).

As an example, an exhaust turbocharger turbine wheel can include three-dimensional bolster regions where each of the three-dimensional bolster regions includes a corresponding fillet region.

As an example, an exhaust turbocharger turbine wheel can include three-dimensional bolster regions where each of the three-dimensional bolster regions includes a geometric centroid. For example, consider each of the geometric centroids as being offset from a corresponding blade joining region of a backdisk toward a suction side of a corresponding one of the blades of the exhaust turbocharger turbine wheel.

As an example, an exhaust turbocharger turbine wheel can include at least five three-dimensional bolster regions. As an example, an exhaust turbocharger turbine wheel can include less than thirty-one three-dimensional bolster regions. In such examples, the numbers can correspond to one three-dimensional bolster region in a region that can be defined by two adjacent blades (e.g., one three-dimensional bolster region per inter-blade region of a backdisk).

As an example, a method can include, for an exhaust turbocharger turbine wheel that includes: a hub that includes a nose, a backdisk with a shaft joint portion, and a rotational axis; blades that extend from the hub to define exhaust flow channels where each of the blades includes a leading edge, a trailing edge, a hub profile, a shroud profile, a pressure side, and a suction side; where the backdisk includes an outer perimeter radius measured from the rotational axis of the hub, an intermediate radius at an outer perimeter of the shaft joint portion measured from the rotational axis of the hub, and an annular recess disposed between the intermediate radius and the outer perimeter radius and defined in part by three-dimensional bolster regions, where each of the three-dimensional bolster regions includes a footprint and a height measured at least in part in a direction of the rotational axis of the hub, removing material from the shaft joint portion to form a balanced exhaust turbocharger turbine wheel; and installing the balanced exhaust turbocharger turbine wheel in a turbocharger. As mentioned, a process that can provide for removing material can utilize a removing tool or tools, which may provide for drilling, cutting, grinding, ablating, etc., material from turbine wheel. For example, a drill can drill material using a drill bit, a cutting tool can cut material using a cutting blade, a grinder can grind material using a grinding bit, a laser can ablate material using a laser beam (e.g., laser or photo ablation), an electrical tool can ablate material using electrical and/or magnetic energy (e.g., electron beam ablation, etc.), etc.

As an example, a method can include operating a turbocharger by flowing exhaust from an internal combustion engine to the turbocharger to rotate a balanced exhaust turbocharger turbine wheel. For example, the aforementioned method of removing material can provide a balanced exhaust turbocharger turbine wheel that can be utilized to pressurize intake air for an internal combustion engine using exhaust of the internal combustion engine.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An exhaust turbocharger turbine wheel comprising:
a hub that comprises a nose, a backdisk with a shaft joint portion, and a rotational axis;
a number of blades that extend from the hub to define exhaust flow channels wherein each of the blades comprises a leading edge, a trailing edge, a hub profile, a shroud profile, a pressure side, and a suction side, wherein the leading edge meets the backdisk and the trailing edge meets the hub;
wherein the backdisk comprises an outer perimeter radius measured from the rotational axis of the hub, an intermediate radius at an outer perimeter of the shaft joint portion measured from the rotational axis of the hub, and an annular recess disposed between the intermediate radius and the outer perimeter radius and defined in part by a number of discrete three-dimensional bolster regions, wherein each of the discrete three-dimensional bolster regions comprises a material volume defined in part by a footprint and a height at least in part in a direction of the rotational axis of the hub, wherein the number of discrete three-dimensional bolster regions is at least five and equal to the number of blades, wherein each of the discrete three-dimensional bolster regions is offset to the suction side of a respective one of the blades, wherein the annular recess comprises a surface that is disposed between the intermediate radius and the outer perimeter radius and that is defined in part by the discrete three-dimensional bolster regions, and wherein each of the discrete three-dimensional bolster regions is a surface bulge of the surface and within the annular recess.

2. The exhaust turbocharger turbine wheel of claim 1 wherein the shaft joint portion comprises a shaft joint surface that comprises a shaft joint radius, wherein the backdisk comprises a relative radius that is less than 0.5 and greater than 0.2 wherein the relative radius is defined as a difference between the intermediate radius at the outer perimeter of the shaft joint portion and the shaft joint radius divided by a difference between the outer perimeter radius and the shaft joint radius.

3. The exhaust turbocharger turbine wheel of claim 1 wherein the exhaust turbocharger turbine wheel is a radial inflow exhaust turbocharger turbine wheel.

4. The exhaust turbocharger turbine wheel of claim 1 wherein the exhaust turbocharger turbine wheel is a mixed-flow inflow exhaust turbocharger turbine wheel.

5. The exhaust turbocharger turbine wheel of claim 1 wherein the backdisk comprises scalloped regions to define a scalloped perimeter.

6. The exhaust turbocharger turbine wheel of claim 5 wherein the backdisk comprises blade joining regions and wherein each of the scalloped regions is disposed between two of the blade joining regions.

7. The exhaust turbocharger turbine wheel of claim 1 wherein the footprint comprises a closed curve perimeter.

8. The exhaust turbocharger turbine wheel of claim 1 wherein each of the discrete three-dimensional bolster regions comprises a corresponding fillet region.

9. The exhaust turbocharger turbine wheel of claim 1 wherein each of the discrete three-dimensional bolster regions comprises a geometric centroid.

10. The exhaust turbocharger turbine wheel of claim 9 wherein each of the geometric centroids is offset from a corresponding blade joining region of the backdisk toward the suction side of a corresponding one of the blades.

11. The exhaust turbocharger turbine wheel of claim 1 comprising less than thirty-one of the discrete three-dimensional bolster regions.

12. The exhaust turbocharger turbine wheel of claim 1, wherein the material volumes of the number of discrete three-dimension bolster regions comprise balancing stock for cutting away during a balancing process of the exhaust turbocharger turbine wheel.

13. The exhaust turbocharger turbine wheel of claim 1, wherein at least one of the discrete three-dimension bolster regions comprises a balancing cut that diminishes its material volume.

14. The exhaust turbocharger turbine wheel of claim 1, wherein the material volumes of the number of discrete three-dimensional bolster regions define at least a portion of a balancing capacity of the exhaust turbocharger turbine wheel.

15. The exhaust turbocharger turbine wheel of claim 1, wherein each of the discrete three-dimensional bolster regions is positioned at a stress spot that reinforces the backdisk.

16. The exhaust turbocharger turbine wheel of claim 1, wherein each of the discrete three-dimensional bolster regions is disposed azimuthally between the suction side of a first one of a pair of the blades and the pressure side of a second one of the pair of the blades and disposed closer to the suction side of the first one of the pair of the blades.

17. A method comprising:
for an exhaust turbocharger turbine wheel comprising: a hub that comprises a nose, a backdisk with a shaft joint portion, and a rotational axis; a number of blades that extend from the hub to define exhaust flow channels wherein each of the blades comprises a leading edge, a trailing edge, a hub profile, a shroud profile, a pressure side, and a suction side, wherein the leading edge meets the backdisk and the trailing edge meets the hub; wherein the backdisk comprises an outer perimeter radius measured from the rotational axis of the hub, an intermediate radius at an outer perimeter of the shaft joint portion measured from the rotational axis of the hub, and an annular recess disposed between the intermediate radius and the outer perimeter radius and defined in part by a number of discrete three-dimensional bolster regions, wherein each of the discrete three-dimensional bolster regions comprises a material volume defined in part by a footprint and a height measured at least in part in a direction of the rotational axis of the hub, wherein the number of discrete three-dimensional bolster regions is at least five and equal to the number of blades, wherein each of the discrete three-dimensional bolster regions is offset to the suction side of a respective one of the blades, wherein the annular recess comprises a surface that is disposed between the intermediate radius and the outer perimeter radius and that is defined in part by the discrete three-dimensional bolster regions, and wherein each of the discrete three-dimensional bolster regions is a surface bulge of the surface and within the annular recess, removing material from the shaft joint portion to form a balanced exhaust turbocharger turbine wheel; and
installing the balanced exhaust turbocharger turbine wheel in a turbocharger.

18. The method of claim 17 further comprising operating the turbocharger by flowing exhaust from an internal combustion engine to the turbocharger to rotate the balanced exhaust turbocharger turbine wheel.

19. An exhaust turbocharger turbine wheel comprising:
a hub that comprises a nose, a backdisk with a shaft joint portion, and a rotational axis;
a number of blades that extend from the hub to define exhaust flow channels wherein each of the blades comprises a leading edge, a trailing edge, a hub profile, a shroud profile, a pressure side, and a suction side, wherein the leading edge meets the backdisk and the trailing edge meets the hub;
wherein the backdisk comprises an outer perimeter radius measured from the rotational axis of the hub, an intermediate radius at an outer perimeter of the shaft joint portion measured from the rotational axis of the hub, and an annular recess disposed between the intermediate radius and the outer perimeter radius and defined in part by a number of discrete three-dimensional bolster regions, wherein each of the discrete three-dimensional bolster regions comprises a material volume defined in part by a footprint and a height at least in part in a direction of the rotational axis of the hub, wherein the number of discrete three-dimensional bolster regions is at least five and equal to the number of blades, wherein each of the discrete three-dimensional bolster regions is disposed azimuthally between the suction side of a first one of a pair of the blades and the pressure side of a second one of the pair of the blades and disposed closer to the suction side of the first one of the pair of the blades, wherein the annular recess comprises a surface that is disposed between the intermediate radius and the outer perimeter radius and that is defined in part by the discrete three-dimensional bolster regions, and wherein each of the discrete three-dimensional bolster regions is a surface bulge of the surface and within the annular recess.

* * * * *